United States Patent
Komiya et al.

(10) Patent No.: US 7,796,512 B2
(45) Date of Patent: Sep. 14, 2010

(54) SWITCHING SOURCE DEVICE, SWITCHING DESTINATION DEVICE, HIGH SPEED DEVICE SWITCHING SYSTEM, AND SIGNALING METHOD

(75) Inventors: Daisaku Komiya, Kanagawa (JP); Sachiko Takeshita, Tokyo (JP); Mingqiang Xu, Chiba (JP); Kentaro Takei, Kanagawa (JP); Maki Amishima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 433 days.

(21) Appl. No.: 11/908,354

(22) PCT Filed: Mar. 13, 2006

(86) PCT No.: PCT/JP2006/304880

§ 371 (c)(1),
(2), (4) Date: Sep. 11, 2007

(87) PCT Pub. No.: WO2006/098263

PCT Pub. Date: Sep. 21, 2006

(65) Prior Publication Data

US 2009/0067425 A1    Mar. 12, 2009

(30) Foreign Application Priority Data

Mar. 14, 2005  (JP) .............................. 2005-070698
Dec. 15, 2005  (JP) .............................. 2005-361595

(51) Int. Cl.
*G01R 31/08* (2006.01)
(52) U.S. Cl. ...................... 370/230; 370/252; 370/389; 370/392

(58) Field of Classification Search ................. 370/230, 370/252, 254, 328, 338, 389, 392, 395.2, 370/401
See application file for complete search history.

(56) References Cited

U.S. PATENT DOCUMENTS

2002/0071429 A1* 6/2002 Donovan .................... 370/352

FOREIGN PATENT DOCUMENTS

| JP | 2003-298676 A | 10/2003 |
| JP | 2003-303143 A | 10/2003 |
| JP | 2003-304251 A | 10/2003 |
| JP | 2004-240906 A | 8/2004 |

OTHER PUBLICATIONS

International Search Report for Application No. PCT/JP2006/304880 dated May 30, 2006.
Ohta, et al., "Mobile Multimedia Middleware for Seamless Service," Study Report of Information Processing Society of Japan: "Mobile Computing and Wireless Communication," No. 18-35, Sep. 7, 2001, pp. 261-268, with English abstract.

* cited by examiner

*Primary Examiner*—Jayanti K Patel
*Assistant Examiner*—Jung Park
(74) *Attorney, Agent, or Firm*—RatnerPrestia

(57) ABSTRACT

A session mobility for moving a session held between a switching source device and a communication counterpart to a switching destination device other than the switching source device. The switching source device transmits media data relating to a session by multicast or broadcast prior to device switching. The switching destination candidate device receives the transmitted media data, and thereby switching destination determined device, in replace of the switching source device, outputs media data. Thus, a switching time from a switching source device to a switching destination device can be made fast such that a user cannot perceive it.

17 Claims, 26 Drawing Sheets

Fig.7

| Buffer control policy / Media data transmission | Buffer amount constant control type | Output time constant control type |
|---|---|---|
| Burst transmission | — | • Reference output time interval<br>• Burst transmitted buffer amount |
| Sequential transmission | • Reference buffer amount | • Reference output time interval<br>• Amount of stored data (number of frames, etc) |

Fig.17

```
INVITE sips:bob@pdnl.example.com SIP/2.0
Via:SIP/2.0/TLS client.pdnl.example.com:5061;branch=z9hG4bK74bf9
Max-Forwards: 70
From: Alice <sips:alice@ndc.example.com>
To: Bob <sips:bob@pdnl.example.com>
Call-ID: 12345600@ndc.example.com
CSeq: 314159 INVITE
Contact: <sips:alice@client.ndc.example.com>
Allow: INVITE, ACK, CANCEL, OPTIONS, BYE, REFER, NOTIFY
Require: bufferonly
Content-Type: application/sdp
Content-Length:...
```

```
v=0
o=alice 2890844526 2890844526 IN IP4 client.ndc.example.com
s=-
c=IN IP4 192.0.2.101
t=0 0
a=bufferonly
m=video 4004 RTP/AVP 32
a=rtpmap:32 MPV/90000
m=audio 4006 RTP/AVP 0
a=rtpmap:0 PCMU/8000
```

```
INVITE sips:bob@pdnl.example.com SIP/2.0
Via:SIP/2.0/TLS client.pdnl.example.com:5061;branch=z9hG4bK74bf9
Max-Forwards: 70
From: Alice <sips:alice@ndc.example.com>;tag=1234567
To: Bob <sips:bob@pdnl.example.com>
Call-ID: 12345600@ndc.example.com
CSeq: 314159 INVITE
Contact: <sips:alice@client.ndc.example.com>
Allow: INVITE, ACK, CANCEL, OPTIONS, BYE, REFER, NOTIFY
Content-Type: application/sdp
Content-Length:...
```

```
v=0
o=alice 2890844526 2890844526 IN IP4 client.ndc.example.com
s=-
c=IN IP4 192.0.2.101
t=0 0
a=bufferonly
m=video 4004 RTP/AVP 32
a=rtpmap:32 MPV/90000
m=audio 4006 RTP/AVP 0
a=rtpmap:0 PCMU/8000
```

SWITCHING SOURCE DEVICE, SWITCHING DESTINATION DEVICE, HIGH SPEED DEVICE SWITCHING SYSTEM, AND SIGNALING METHOD

This application is a U.S. national phase application of pct international application PCT/JP2006/304880.

TECHNICAL FIELD

The present invention relates to a switching source device, a switching destination device, and a high speed device switching system for realizing session mobility in communication technology and media transmission technology, and the like, in an IP network, and a signaling method used for the same.

BACKGROUND ART

Recently, in addition to an optical fiber and ADSL in a fixed network, also in a mobile network, spot wireless technologies such as WLAN and an Ad-Hoc network have been widespread. Then, a ubiquitous network environment in which network connection can be made everywhere is becoming realized. Furthermore, also in the field of communication terminals, devices having various abilities, for example, Internet home appliances and public-local dual terminals have been developed. There has been a strong demand for a seamless service capable of providing continuous services by freely switching various access networks and devices having various abilities in a ubiquitous network environment.

As a technology for realizing a seamless service, three technologies have been proposed. The first technology is referred to as network seamless. In this technology, one mobile terminal can switch between different networks seamlessly in accordance with the movement, and the like, so that the communication can be continued. The mobile terminal has a plurality of network interfaces and can switch access networks freely in accordance with the movement. The network seamless is also referred to as terminal mobility.

The second technology is referred to as device seamless. In this technology, a user can seamlessly switch terminals in use. Thus, a session used in one terminal can be continuously used in another terminal. This technology is also referred to as session mobility because the session is moved to another terminal.

The third technology is referred to as contents seamless. In this technology, a media format, a media type, and the like, can be switched seamlessly. Thus, display and reproduction can be carried out by switching media in accordance with a network band, device ability, a peripheral environment, and the like. The contents seamless may be also referred to as media adaptive (media adaptation).

These three technologies are very important in realizing seamless service, and they can exhibit independent effects, respectively. Therefore, these technologies can be used alone or in a combination thereof.

A seamless service employing device seamless technology (hereinafter, referred to as "device switching") is thought to include the following situation. For example, as soon as a user, who comes home while viewing a streaming movie by using a mobile terminal such as a portable telephone, enters the living room of his/her house, he/she instantly switches the display to a large size television display and views the continuation of the movie.

In general, a display of a mobile terminal is small and not preferable for viewing movies. Thus, when a suitable device capable of continuously providing service is discovered in the surrounding in accordance with the movement and if a device can be switched to the device, very high applicability is achieved.

A technology for satisfying such a demand is described in Japanese Patent Unexamined Publication No. 2003-304251. FIG. 26 shows a conventional device switching method described in this patent publication.

In FIG. 26, firstly, mobile terminal (PDA) 121 possessed by a user detects neighboring terminal (PC) 122 by using short distance radio and automatically obtains an address on the communication network of neighboring terminal (PC) 122. Then, mobile terminal (PDA) 121 becomes a transfer source terminal and transfers a communication session of the application level during communication with communication destination terminal (PC) 300 to neighboring terminal (PC) 122 that is a transfer destination terminal.

Next, a conventional device switching system is described with reference to drawings.

FIG. 19 is a diagram showing a configuration of a conventional device switching system. This system includes mobile node (hereinafter, referred to as "MN") 1301 that is a switching source device; counterpart node (hereinafter, referred to as "CN") 1302 that is a communication counterpart; the Internet 1303; device group 1304 that is a switching destination device for device switching, for example, plasma TV, stereo, and PC; and personal area network (hereinafter, referred to as "PAN") 1305 for mutually connecting between MN 1301 and device group 1304.

MN 1301 and device group 1304 can freely communicate with each other in PAN 1305 by using PAN 1305. Furthermore, CN 1302 and MN 1301 communicate with each other via the Internet 1303. CN 1302 is, for example, a streaming server. MN 1301 streaming receives a movie distributed from CN 1302. Note here that a network between MN 1301 and CN 1302 is not necessarily the Internet. It may be, for example, a third generation mobile communication network (3GPP network).

Next, a configuration inside the device of MN 1301 that is a switching source device for realizing device switching is described with reference to FIG. 20.

MN 1301 includes application 1401, at least one network I/F 1402, output section 1403 for outputting a display, input section 1404 as an interface (I/F) with respect to a user, operating system 1405, media sending section 1406 communicating with an external device (not shown) via operating system 1405, media receiving section 1407, media buffer 1408 for storing media data received by media receiving section 1407, decoder 1409 for decoding data when media data are compressed, signaling section 1410 for controlling a session, service discovery section 1411 for discovering a service provided by an external switching destination device (not shown), and middleware 1412 for controlling so that media sending section 1406 transfers received media data to the switching destination device.

As mentioned above, it can be thought that MN 1301 is one of the devices of device group 1304 and a switching destination device has the same configuration as that of MN 1301. However, when it is not necessary that the switching destination device operate as a switching source device, application 1401, input section 1404 and media sending section 1406 may be omitted from the configuration.

FIG. 21 is a view showing a message sequence between MN 1301 and switching destination device group 1304. FIG. 22 is a flowchart showing the similar message sequence. Herein, device group 1304 includes N pieces of devices from device 1 to device N. Furthermore, MN 1301 holds another session with CN 1302 although not shown in the drawing. In FIG. 21, a user denotes a user who currently uses MN 1301, and the user can give an instruction to MN 1301 via input section 1404. Furthermore, an arrow in FIG. 21 indicates that a message is sent in the direction from the starting point to the ending point.

An operation of a conventional device switching system is described with reference to the sequence diagram shown in FIG. 21 and the flowchart shown in FIG. 22.

A user who intends to switch devices makes an instruction of request to MN 1301 to display names of switching destination candidate devices (U1) by using input section 1404 of MN 1301 (step S1601).

Next, middleware 1412 that receives the instruction through input section 1404 of MN 1301 sends service discovery request (M1) to devices 1 to N in PAN 1305 at one time through service discovery section 1411 (step S1602).

Next, when service discovery section 1411 of the switching destination device receives the service discovery request from MN 1301, it replies service discovery response (M2) to MN 1301 (step S1603). As a service discovery protocol used by service discovery section 1411, existing protocols such as SSDP (Simple Service Discovery Protocol) of UPnP (Universal Plug and Play), SDP and SLP (Service Location Protocol) of Bluetooth (trademark) are used.

Service discovery section 1411 of MN 1301 receives service discovery response (M2) from the switching destination device and notifies middleware 1412 of it. Middleware 1412 generates a switching destination candidate F device list including devices capable of providing service based on the notification, and the list is presented (U2) to a user by output section 1403 via operating system 1405 (step S1604). Note here that the switching destination candidate device list is a list including identifiers (for example, a device name) specifying devices.

The user selects switching destination device (U3) from the switching destination candidate device list by input section 1404 of MN 1301 (step S1605). The selected switching destination device (hereinafter, referred to as "switching destination determined device") is notified to middleware 1412. The sequence diagram of FIG. 21 illustrates a case where device 2 is selected as a switching destination device is described.

Middleware 1412 of MN 1301 establishes a session with selected device 2 in PAN 1305, and in order to transmit media, it sends session establishment—media processing preparation request (M3) to device 2 through signaling section 1410 (step S1606). At the same time, middleware 1412 of MN 1301 notifies media receiving section 1407 and media sending section 1406 to start preparation for transferring the received media data to a switching destination device. As signaling section 1410, an existing protocol such as SIP (session initiation protocol) can be used.

When signaling section 1410 of switching destination device 2 receives session establishment—media processing preparation request (M3) from MN 1301, middleware 1412 of device 2 instructs media receiving section 1407, media buffer 1408 and decoder 1409 to start media processing preparation. When the media processing preparation is completed, middleware 1412 of device 2 sends session establishment—media processing preparation response (M4) to MN 1301 through signaling section 1410 (step S1607).

When signaling section 1410 of MN 1301 receives session establishment—media processing preparation response (M4) from device 2, middleware 1412 of MN 1301 notifies media sending section 1406 that media receiving section 1407 starts transmission (D1) of the media data received from CN 1302 to device 2 (step S1608).

Media receiving section 1407 of device 2 receives media data transferred by MN 1301 and starts storing the media data into media buffer 1408. When predetermined media data are stored in media buffer 1408, middleware 1412 notifies decoder 1409 to start a decoding operation when the media data are compressed. The decoded data are output (D2) to output section 1403 via operating system 1405 (step S1609). On the other hand, when media data are not compressed, the media data stored in media buffer 1408 are output to output section 1403 via operating system 1405.

As mentioned above, it is possible to realize device switching from MN 1301 to switching destination device 2. As a result, the media data that have been output to output section 1403 of MN 1301 are output from output section 1403 of device 2. In this series of switching sequence, a time that elapses from the time when a user intends to switch devices and instructs MN 1301 to display switching destination candidate device request (U1) to the time when data are output (D2) to output section 1403 of device 2 is a time necessary for switching. As the time necessary for switching is shorter, the user's waiting time in switching is reduced and more seamless service can be provided.

However, in the device switching in accordance with such a conventional technology, several seconds are required from service discovery request (M1) to the reception of service discovery response (M2). Furthermore, several seconds are required from session establishment—media processing preparation request (M3) to the reception of session establishment—media processing preparation response (M4). As a result, a time necessary for switching, that is, a user's waiting time becomes considerably long. Thus, for example, in the case where a user is viewing a soccer game in real time, the user may miss watching an important moment such as a goal scene because of the device switching.

Then, in order to reduce the time necessary for switching devices, a document "Mobile Multimedia Middleware for Seamless Service" (Ken Ohta et al., study report of Information Processing Society of Japan: "Mobile Computing and Wireless Communication" No. 18-35, Sep. 7, 2001, p 261-268) discloses two technologies, that is, a technology in which service discovery has been periodically carried out in advance (technology A) and a technology in which session establishment and media processing preparation have been carried out previously with respect to all devices obtained as a result of the service discovery (technology B).

With such technologies, it is possible to reduce the time necessary for switching devices, which is described with reference to drawings. The internal configuration of MN 1301 or the terminal of a switching destination device in the document "Mobile Multimedia Middleware for Seamless Service" is exactly the same as that described in FIG. 20 except for an operation of middleware 1412. Then, in order to distinguish this middleware from middleware 1412 shown in FIG. 20, the middleware of the document "Mobile Multimedia Middleware for Seamless Service" is referred to as a "high speed middleware."

FIG. 23 shows a message sequence between MN 1301 and switching destination device group 1304 in the document "Mobile Multimedia Middleware for Seamless Service." FIG. 24 is a flowchart showing an operation of a switching source device in the document. FIG. 25 shows a flowchart of an operation of a switching destination device. Herein, device group 1304 includes N pieces of switching destination devices from device 1 to device N. Furthermore, although not shown, MN 1301 holds another session with CN 1302.

Next, operations of the switching source device and the switching destination device are described. Hereinafter, in these operations, the same reference numerals are given to the same component elements as those shown in FIG. 20.

Firstly, an operation of the switching source device is described with reference to the flowchart shown in FIG. 24.

When a session with CN 1302 is continued ("YES" in step S1801), in order to carry out service discovery with respect to surrounding device group 1304, the high speed middleware periodically sends service discovery request (M1) to devices 1 to N in PAN 1305 at one time through service discovery section 1411 (step S1802). On the other hand, when the session with CN 1302 is not continued ("NO" in step S1801), the following operation is terminated.

Service discovery section 1411 receives service discovery response (M2) from the switching destination device and notifies the high speed middleware of it (step S1802). Based on the notification, the high speed middleware generates a switching destination candidate device list of devices capable of providing a service (step S1803) and holds it therein. When a switching destination candidate device list already exists, the high speed middleware updates the list.

The high speed middleware sends session establishment— media processing preparation request (M3) through signaling section 1410 to all the devices that are switching destination candidates described in the switching destination candidate device list in order to establish a session and carry out media transmission (step S1804). Herein, the number of the devices that become the switching destination candidates is n ($1 \leq n \leq N$).

At the same time, the high speed middleware notifies media receiving section 1407 and media sending section 1406 to start preparation for transferring the received media data to a switching destination candidate device (step S1805).

When signaling section 1410 receives session establishment—media processing preparation response (M4) from the device in the switching destination candidates (step S1806), the high speed middleware is in a waiting state for a predetermined time.

While the high speed middleware is in a waiting state, when an instruction of switching destination candidate device display request (U1) is not sent from a user ("NO" in step S1807), the service discovery is carried out again. On the other hand, when an instruction of switching destination candidate device display request (U1) is sent from a user ("YES" in step S1807), the high speed middleware presents the switching destination candidate device list held therein to a user (U2) through output section 1403 (step S1808).

The user selects a switching destination device (U3) from the switching destination candidate device list through input section 1404 (step S1809). Input section 1404 notifies the high speed middleware of the name of the selected switching destination determined device via operating system 1405. This flowchart illustrates the case in which device 2 is selected.

The high speed middleware notifies media sending section 1406 to start transmitting (D1) media data received by media receiving section 1407 from CN 1302 (step S1810). Media sending section 1406 starts transferring the designated media data to switching destination determined device 2.

The high speed middleware sends session disconnection request (M5) through signaling section 1410 to devices other than device 2 among the n pieces of switching destination candidate devices that are switching destination candidates (step S1811). The high speed middleware receives session disconnection response (M6) from these devices and completes the switching operation.

Next, operations of the switching destination candidate device and the switching destination device as a switching destination determined device are described with reference to the flowchart shown in FIG. 25.

Service discovery section 1411 of the switching destination device, which receives service discovery request (M1), sends service discovery response (M2) to MN 1301 (step S1901).

Signaling section 1410 receives session establishment— media processing preparation request (M3) from MN 1301 (step S1902). Next, the high speed middleware makes an instruction to media receiving section 1407, media buffer 1408 and decoder 1409 to start preparation for media processing (step S1903).

When the preparation for media processing is completed, the high speed middleware sends session establishment— media processing preparation response (M4) to the switching source device through signaling section 1410 (step S1904).

Media receiving section 1407 of switching destination device 2 receives media data transferred from the switching source device (step S1905) and starts storing the media data into media buffer 1408 (step S1906). When predetermined data are stored in media buffer 1408, when the media data are not compressed ("YES" in step S1907), the high speed middleware sends the data stored in media buffer 1408 to output section 1403 via operation system 1405 (step S1909). On the other hand, when the media data are compressed ("NO" in step S1907), the high speed middleware notifies decoder 1409 to start a decoding operation (step S1908) and sends the decoded data to output section 1403 via operating system 1405. Output section 1403 starts outputting the received media data (D2) (step S1909) and completes the switching operation.

On the other hand, when signaling section 1410 of a device that does not become a switching destination determined device receives session disconnection request (M5) from the switching source device, the high speed middleware makes an instruction to media receiving section 1407, media buffer 1408 and decoder 1409 to terminate the preparation for media processing (step S1910).

When media receiving section 1407, media buffer 1408 and decoder 1409 terminate the preparation for media processing, the high speed middleware sends session disconnection response (M6) to the switching source device through signaling section 1410 (step S1911) and terminates the switching operation.

As mentioned above, according to the technology described in the document "Mobile Multimedia Middleware for Seamless Service," it was possible to switch from a switching source device to a switching destination device at a high speed.

That is to say, before an instruction of a switching destination candidate device display request is sent from a user (step S1807), the operations from service discovery request (M1) to the reception of service discovery response (M2) (step S1802 to step S1803 and step S1901) have been periodically carried out (above-mentioned technology A) with respect to the display request of a switching destination candidate device from a user, a substantial operation time at the time of switching can be made to be zero. Thus, the time necessary for presenting a device list can be reduced.

Furthermore, before an instruction to select a switching destination device is made from a user (step S1809), the operations from session establishment—media processing preparation request (M3) to the reception of session establishment—media processing preparation response (M4) (step S1804 to step S1806 and step S1902 to step S1904) have been carried out with respect to all the switching destination candidate devices that are switching destination candidates obtained by the service discovery (above-mentioned technology B), a substantial operation time at the time of device switching can be made to be zero. Thus, the time necessary to start an output of media data at the selected switching destination device can be reduced.

As a result, a time necessary for switching, that is, a time that elapses from the time when a user intends to switch devices and makes an instruction of the switching destination candidate device display request (U1) to the switching source device to the time when media data are output (D2) to the output section of the selected switching destination device is significantly reduced.

However, in the technology described in the document "Mobile Multimedia Middleware for Seamless Service," from the time the selected switching destination device starts to receive media data to the time when the output section of the switching destination device starts outputting media data (step S1905 to step S1909), about several hundreds milliseconds are required, and therefore a sufficient seamless service cannot be still realized. Furthermore, in order to avoid the delay, the sending section of the switching source device sends data from a media data portion newly received by the receiving portion (step S1810), media data that have been stored in the media buffer of the switching source device and that have not yet output at switching source device are not transferred to the switching destination device. Therefore, since the output portion of the switching destination device cannot output the media data portion, the output media data have defectiveness, resulting in generating discontinuous output.

SUMMARY OF THE INVENTION

An object of the present invention is to provide a switching source device, a switching destination device and a high speed device switching system capable of reducing a time necessary for switching a device in communication of media data to another device, that is, a time that elapses from the time when a user intends to switch devices and inputs a device switch request to a switching source device to the time when media data are output to an output section of the selected switching destination device. Another object of the present invention is to provide a switching source device, a switching destination device and a high speed device switching system capable of realizing device switching in which the disconnection between media data of the switching source device and media data output at the switching destination device is prevented.

The switching source device of the present invention moves a session established with a communication counterpart to a switching destination device. Then, in particular, the switching source device of the present invention includes a service discovery section, a high speed device switching section, a signaling section, an input section and an output section. The service discovery section obtains information as to whether a service can be provided from a neighboring communication device. Furthermore, the high speed device switching section instructs the service discovery section at an arbitrary timing to inquire whether or not a service can be provided, and determines a switching destination candidate device that becomes a switching destination of the session based on the obtained information as to whether or not a service is provided. Then, the high speed device switching section generates a switching destination candidate device list describing the switching destination candidate devices, and at the same time, makes an instruction for establishing a session with the switching destination candidate devices. Furthermore, the signaling section establishes a session with the switching destination candidate device when the instruction for establishing a session is received from the high speed device switching section. Furthermore, the input section receives a switching destination candidate device list request from a user. The output section presents the switching destination candidate device list when the high speed device switching section receives the switching destination candidate device list request through the input section. Then, when the high speed device switching section receives a device switching request from a user through the input section, it notifies the signaling section of the device selected from the switching candidate device list. The signaling section receives this notification, and sends a switching instruction to the selected device.

With this configuration, before the switching destination candidate device list request is input from a user, service discovery by the service discovery section is executed, and the high speed device switching section can hold the switching destination candidate device list therein. Therefore, when a device switching request is input from a user, the signaling section can switch the device to a switching destination determined device selected from the switching destination candidate devices, immediately.

Furthermore, the switching source device of the present invention further includes a media receiving section, a buffer control section and a media sending section. The media receiving section receives media data from a communication counterpart and stores them in a media buffer. The buffer control section controls the media data stored in the media buffer. The media sending section receives a media data transfer request from the high speed device switching section and transfers the media data stored in the media buffer to all the switching destination candidate devices. Then, when the device switching request from a user is received, the signaling section sends an instruction to the selected switching destination candidate device to output the received media data.

With this configuration, the media data received by the media receiving section by the instruction of the high speed device switching section are transferred to all the switching destination candidate devices and the media data are stored in the switching destination devices. Therefore, when the device switching request is input from a user, the signaling section sends a media output notification to the switching destination determined device selected from the switching destination candidate devices. Thus, the switching destination determined device can output media data that have already been stored without newly storing media data. As a result, it is possible to realize device switching at a high speed such that a user cannot perceive a switching delay.

Furthermore, in the switching source device of the present invention, a buffer control section generates buffer control information including a buffer control policy or a data size for controlling the media buffer.

With this configuration, when a session is established with the switching destination candidate device that is a candidate of the switching destination, the signaling section can send the buffer control information by adding it to a payload or a header of a signaling message. Thus, a device that is a switching destination candidate can control a media buffer to be in the same state as that of the media buffer of the switching source device by referring to the buffer control information.

As a result, the switching destination device can also hold continuity of media data provided to a user without increasing a communication delay.

The switching destination device of the present invention receives a movement of a session from the device establishing the session with a communication counterpart. In particular, the switching destination device includes a service response section, a signaling section, a media receiving section, a buffer control section, an output section and a high speed device switching section. The service response section responds to an inquiry sent from the switching source device as to whether or not a service can be provided. The signaling section controls a session between a self and a communication counterpart or the switching source device. The media receiving section receives media data from the communication counterpart and the switching source device when the service response section responds that a service can be provided. The buffer control section controls the media buffer based on the buffer control information for making the state of the media buffer storing the media data received by the media receiving section identical to that of the media buffer received after the signaling section establishes a session with the switching source device. Furthermore, the output section provides a user with the media data of the media buffer. Furthermore, the high speed device switching section outputs the media data transferred from the switching source device to the output section based on the media output notification received by the signaling section from switching source device.

With this configuration, the switching destination device can store media data before the media receiving section receives a device switching instruction, and can keep them at the same state as that of the switching source device. Therefore, when the device switching request is input from a user, when the switching destination device receives a media output notification from the switching source device, it can immediately output the stored media data.

Thus, according to the present invention, since a time necessary for device switching can be reduced to short such that a user cannot perceive it, it is possible to realize an extremely seamless service in switching devices. At this time, the continuity of media data can be maintained between the switching source device and the switching destination device without increasing a communication delay with respect to a communication counterpart.

BRIEF DESCRIPTION OF THE DRAWINGS

FIG. 6A is a view to illustrate a way of transmitting media data and a way of controlling a buffer when the switching source device transmits media data by sequential transmission in the high speed device switching system in accordance with the first exemplary embodiment of the present invention.

FIG. 7 is a view showing an example of buffer control information in the high speed device switching system in accordance with the first exemplary embodiment of the present invention.

FIG. 17 is a view showing an example of message contents and media output control information when the media processing preparation request (M3') message is SIP in accordance with the present invention.

FIG. 18 is a view showing another example of message contents and media output control information when the media processing preparation request (M3') message is SIP in accordance with the present invention.

Figure 1:
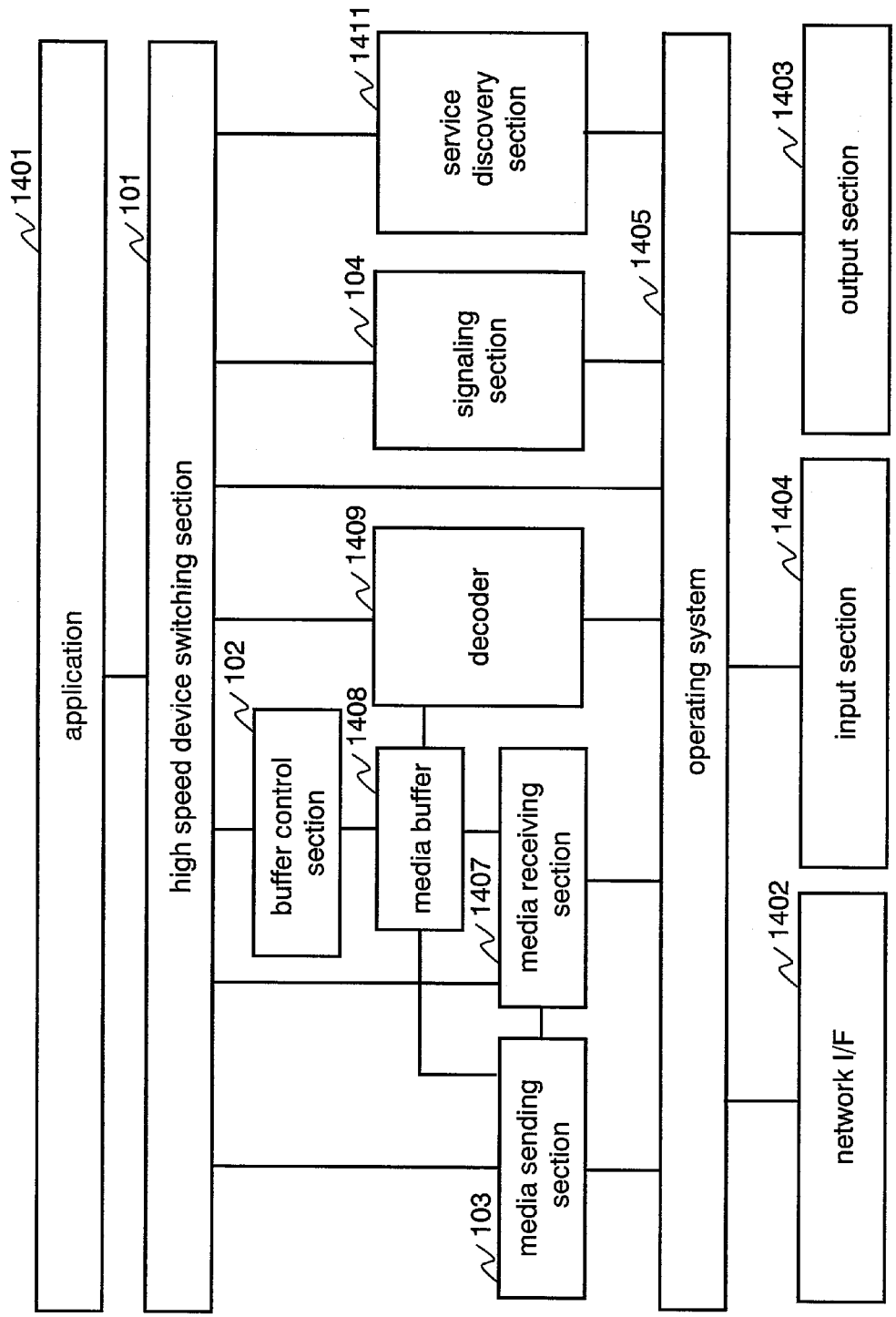
FIG. 1 is a block diagram showing a configuration of a switching source device in a high speed device switching system in accordance with a first exemplary embodiment of the present invention.

REFERENCE MARKS IN THE DRAWINGS 101, 801 high speed device switching section
102 buffer control section
103, 1406 media sending section
104, 1410 signaling section
805 media sending/receiving section
806 media output control section
807 media output section
1001 preference information holding section
1041 media output control information generating section
1042 signaling message generating section
1043 media output control information adding section
1044 signaling message sending/receiving section
1301 mobile node (MN)
1302 counterpart node (CN)
1303 Internet
1304 device group
1305 personal area network (PAN)
1401 application
1402 network I/F
1403 output section
1404 input section
1405 operating system
1407 media receiving section
1408 media buffer
1409 decoder
1411 service discovery section
1412 middleware
1511 service response section
2001 polling section
2002 candidate device confirmation section
2003 list management section

DEFILED DESCRIPTION OF THE PREFERRED EMBODIMENTS

Hereinafter, the exemplary embodiments of the present invention are described with reference to drawings.

First Exemplary Embodiment

A high speed device switching system of a first exemplary embodiment of the present invention is a system that realizes session mobility for moving a session held between a switching source device and a communication counterpart to a switching destination device that is other than the switching source device.

Figure 19:
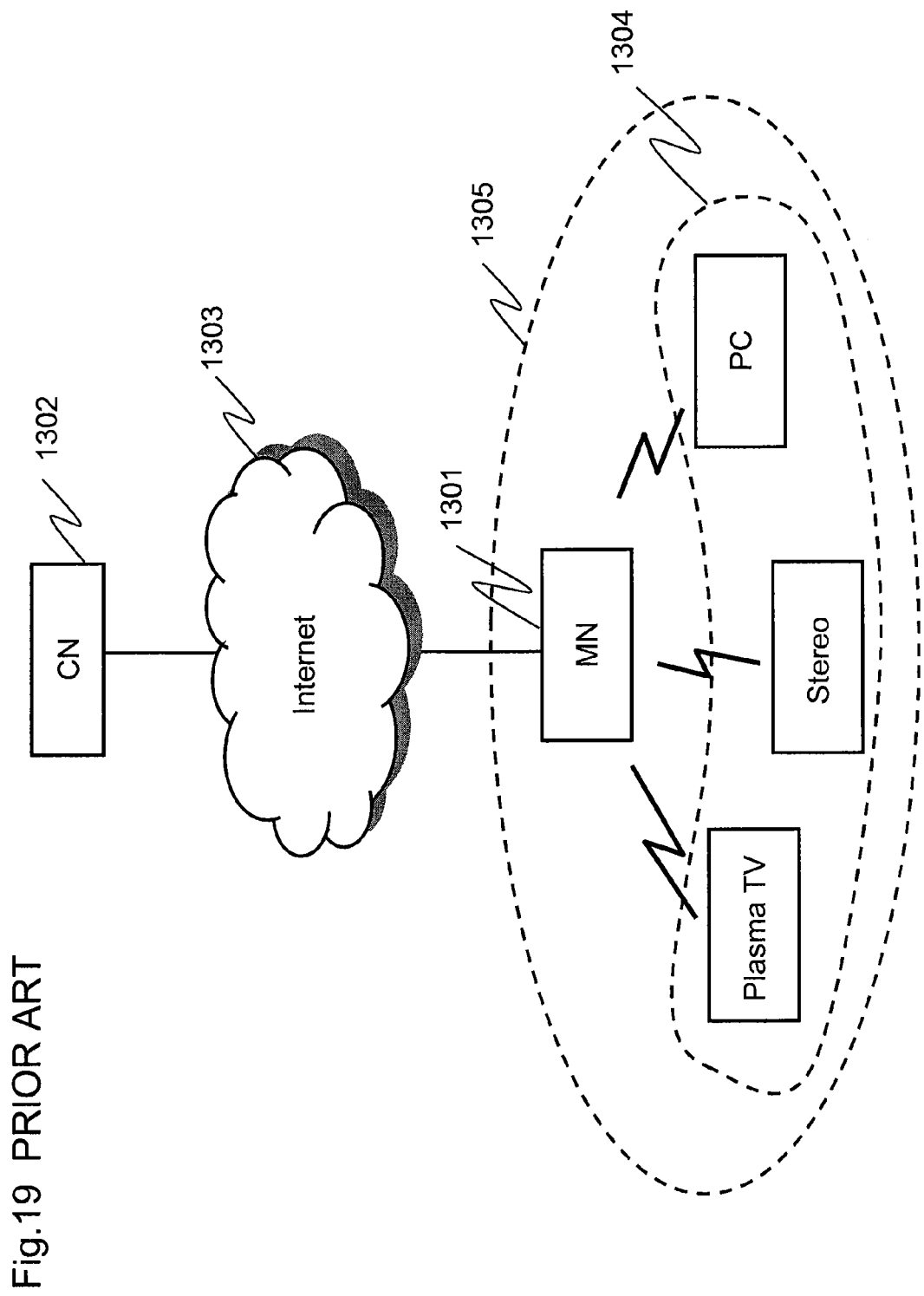
FIG. 19 is a system configuration diagram showing an example of a configuration of a conventional device switching system.
Figure 20:
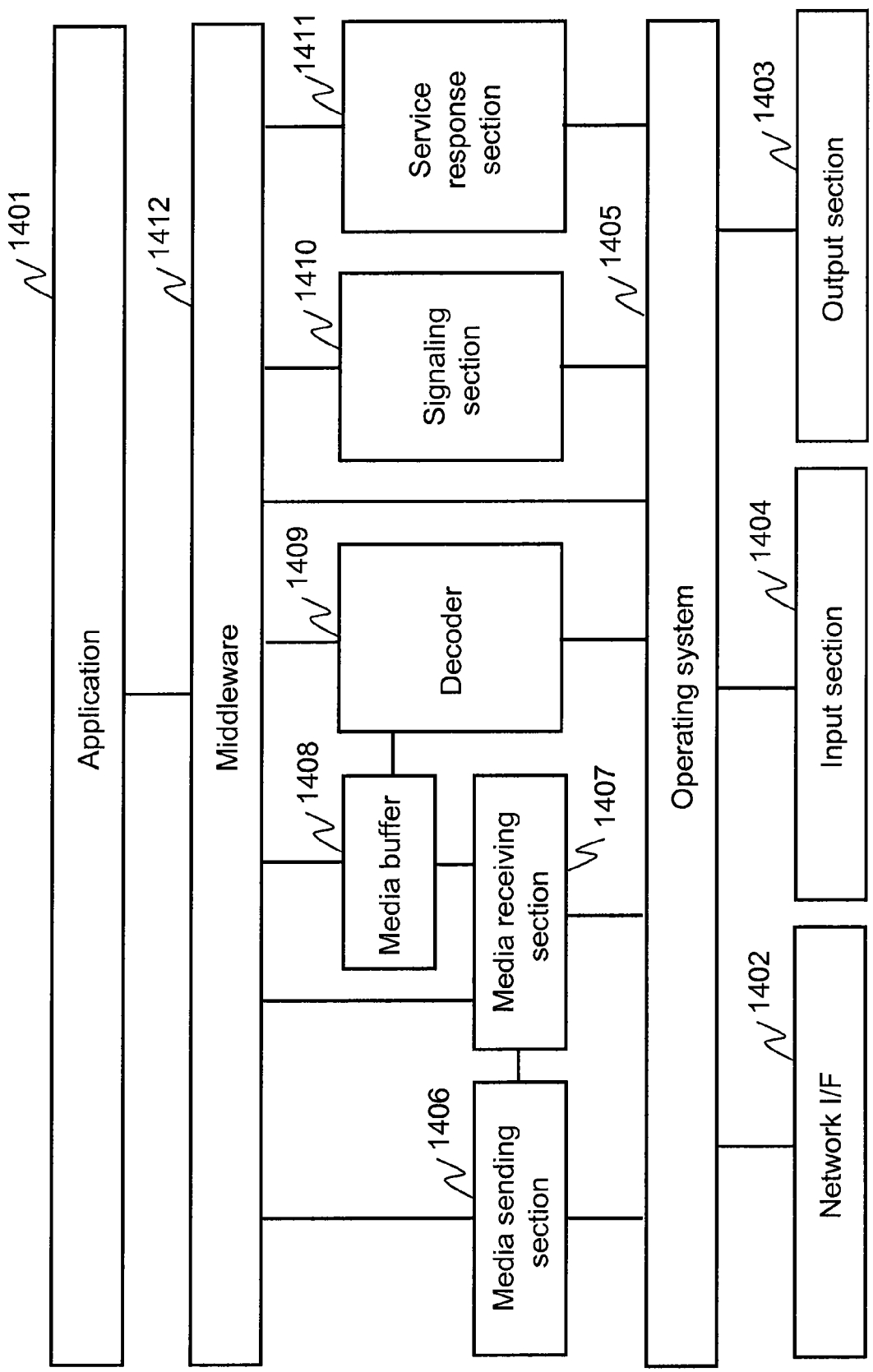
FIG. 20 is a block diagram showing a configuration of a switching source device or a switching destination device in a conventional device switching system.

The configuration of the high speed device switching system of the first exemplary embodiment of the present invention is the same as that shown in FIG. 19, and mobile node (MN) 1301 and device group 1304 correspond to a switching source device and a switching destination device in accordance with the present invention, respectively.

FIG. 1 is a diagram showing an internal configuration of the switching source device in the high speed device switching system in accordance with this exemplary embodiment.

In FIG. 1, the switching source device of this exemplary embodiment includes application 1401, at least one network I/F 1402, output section 1403 for outputting a display, input section 1404 for receiving input from a user, operating system 1405, media sending section 103 for sending media data to an external device via operating system 1405, media receiving section 1407 for receiving media data from the external device, media buffer 1408 for storing media data received by media receiving section 1407, buffer control section 102 for generating and using buffer control information, decoder 1409 for decoding compressed media data, signaling section 104 for controlling a session with the external device, service discovery section 1411 for discovering a service provided by a neighboring external communication device, and high speed device switching section 101 for outputting an instruction, for transferring media data received by media receiving section 1407 to the switching destination candidate device, to media sending section 103.

In the above-mentioned configuration, high speed device switching section 101, buffer control section 102, media sending section 103 and signaling section 104 are different component elements from those of a conventional configuration. Herein, high speed device switching section 101 corresponds to a conventional high speed middleware and includes modified and added functions. Buffer control section 102 is a newly added component that was not provided in a conventional system. Buffer control section 102 generates buffer control information which the switching destination candidate device refers to when it controls the media buffer of the switching destination device. Furthermore, media sending section 103 and signaling section 104 are obtained by adding partial function to conventional components. That is to say, media sending section 103 can also carry out transferring of media data stored in media buffer 1408. Signaling section 104 further carries out communication of buffer control information generated by buffer control section 102.

Figure 13:
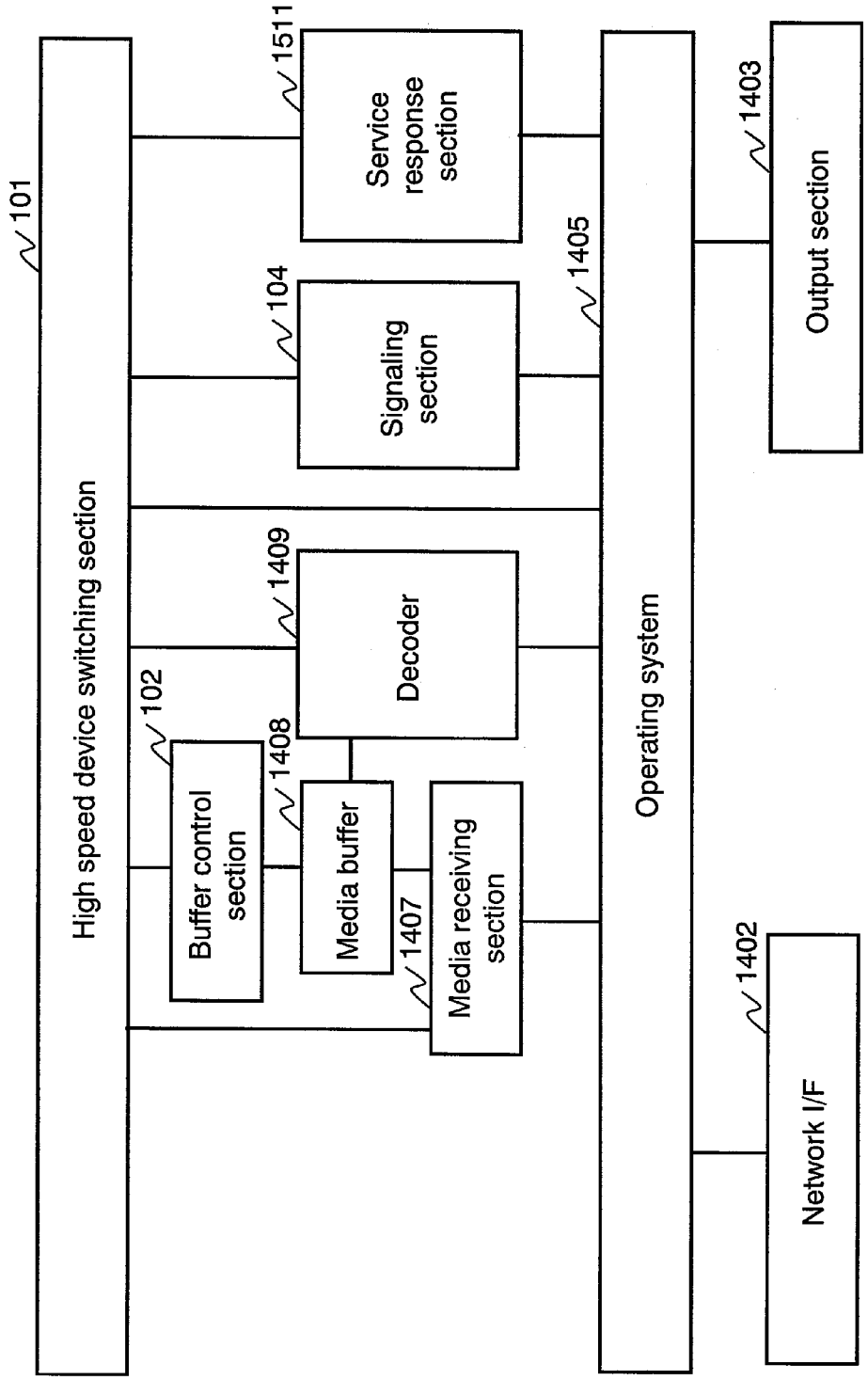
FIG. 13 is a block diagram showing a configuration of a switching destination device in the high speed device switching system in accordance with a first exemplary embodiment of the present invention.

FIG. 13 is a view showing an internal configuration of the switching destination device in the high speed device switching system in accordance with this exemplary embodiment.

In FIG. 13, service response section 1511 responds to an inquiry as to whether or not a service can be provided, which is sent from service discovery section 1411 of the switching source device. The other configurations are the same as those shown in FIG. 1.

Note here that the configuration of the switching destination device may be exactly the same as that of the switching source device shown in FIG. 1. In this case, the devices can be used without distinguishing between a switching source and a switching destination.

Figure 2:
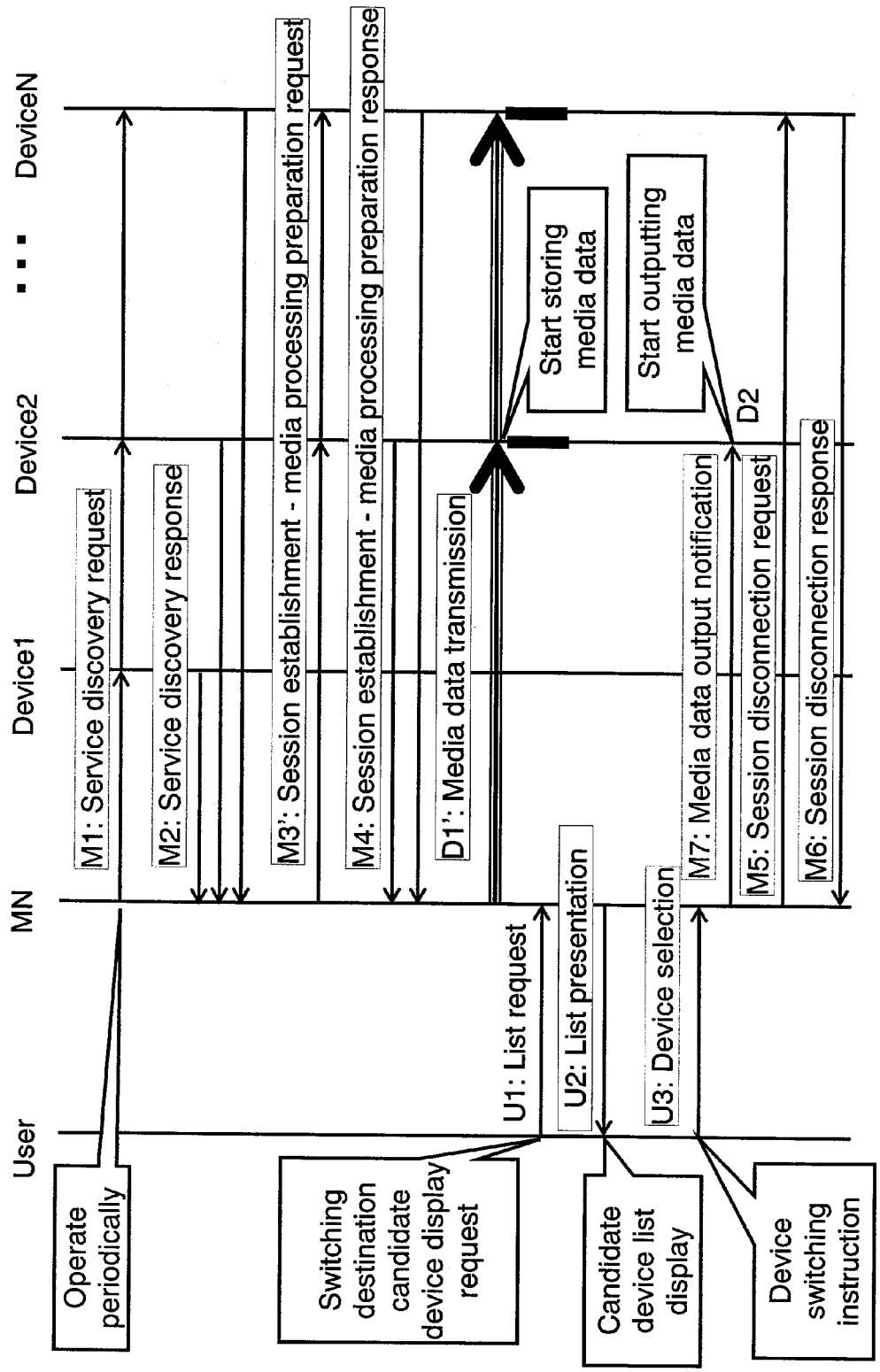
FIG. 2 is a sequence diagram showing a message exchange between the switching source device and a switching destination device group in the high speed device switching system in accordance with the first exemplary embodiment of the present invention.
Figure 3:
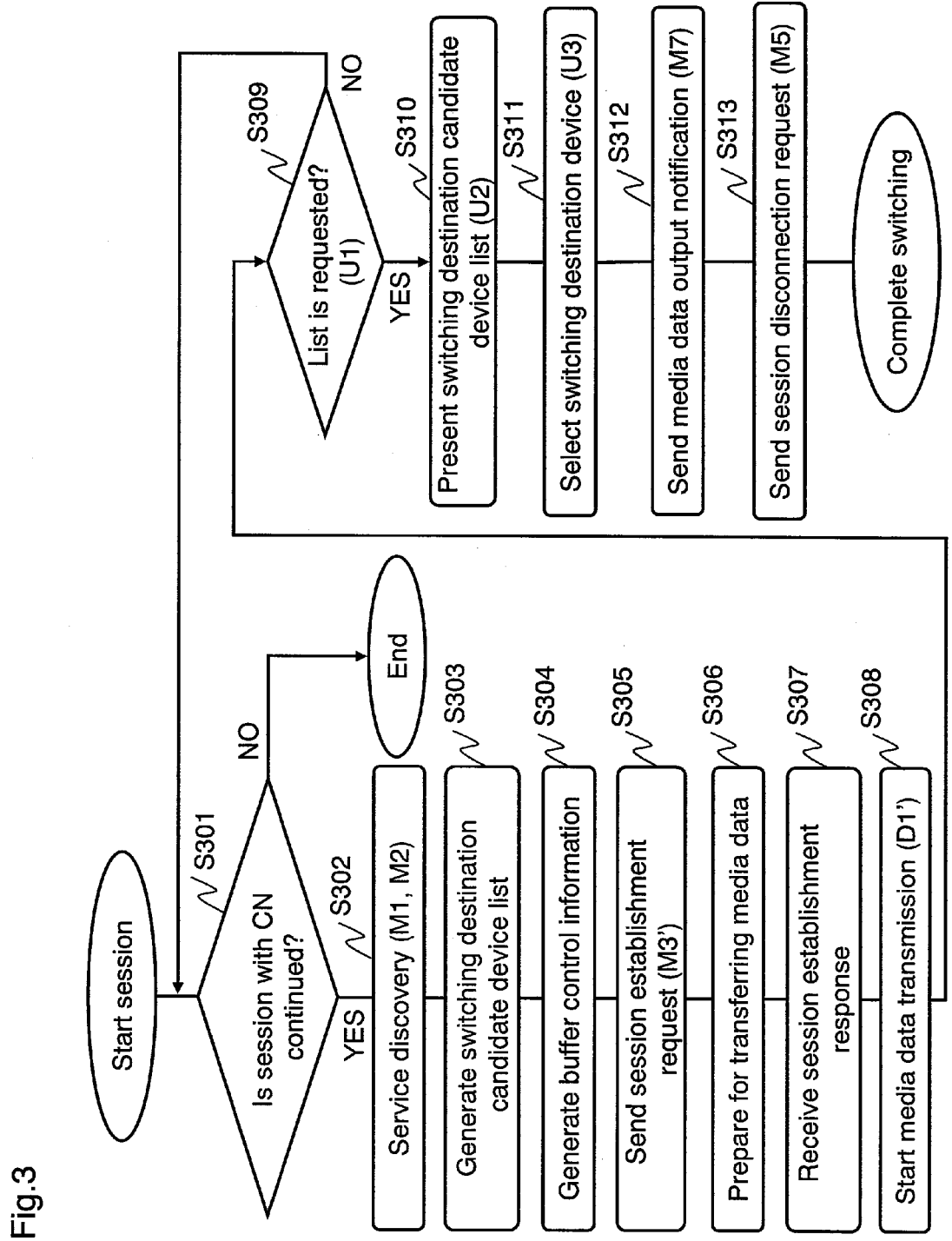
FIG. 3 is a flowchart showing a flow of an operation of the switching source device in the high speed device switching system in accordance with the first exemplary embodiment of the present invention.
Figure 4:
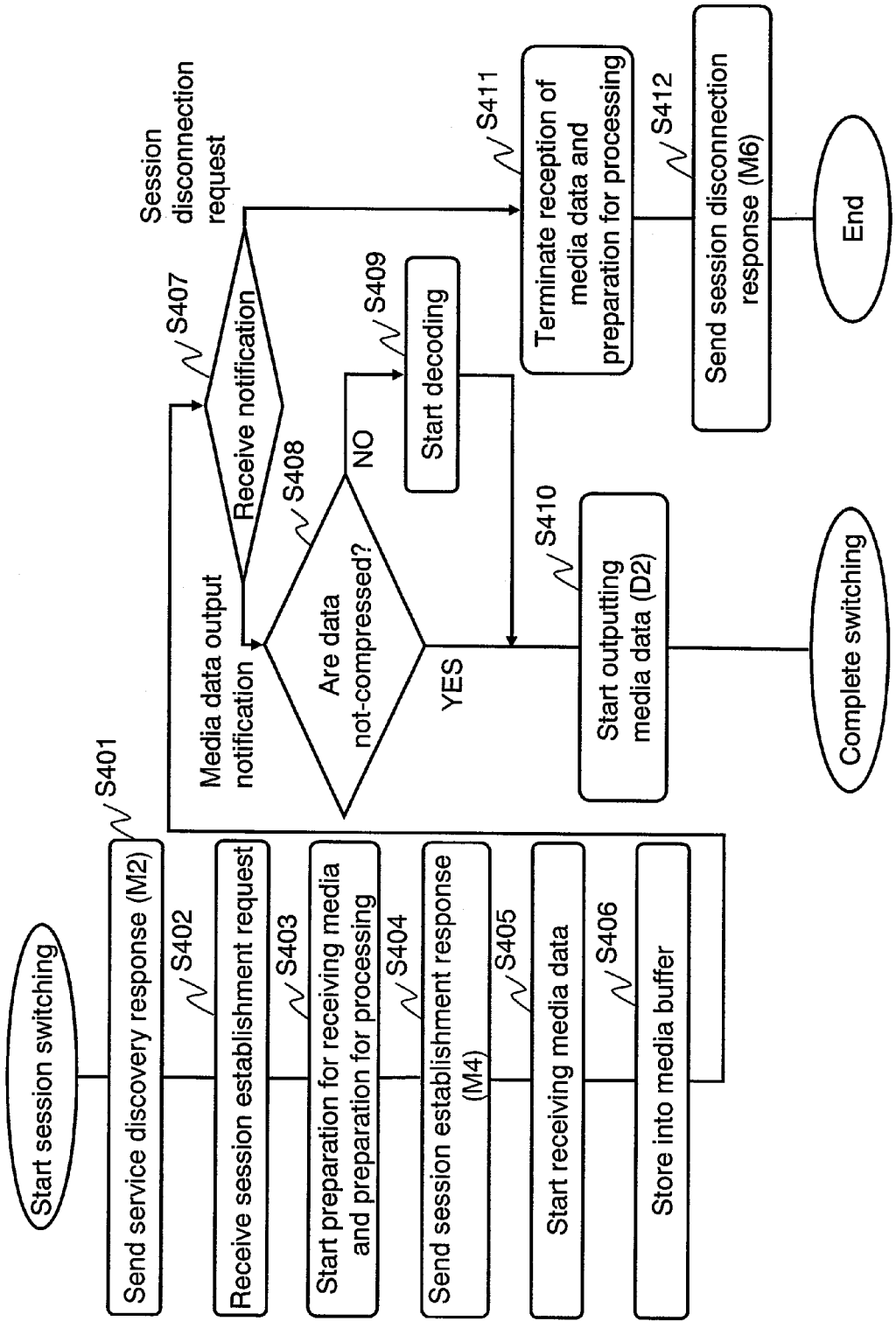
FIG. 4 is a flowchart showing a flow of an operation of the switching destination device in the high speed device switching system in accordance with the first exemplary embodiment of the present invention.

FIG. 2 is a view showing a sequence relating to a message between the switching source device and the switching destination device group. FIG. 3 is a flowchart to illustrate an operation of the switching source device. FIG. 4 is a flowchart to illustrate an operation of the switching destination device. Herein, the device group includes N pieces of devices, that is, devices 1 to N. Furthermore, the switching source device holds another session with CN although not shown in the drawing.

Figure 24:
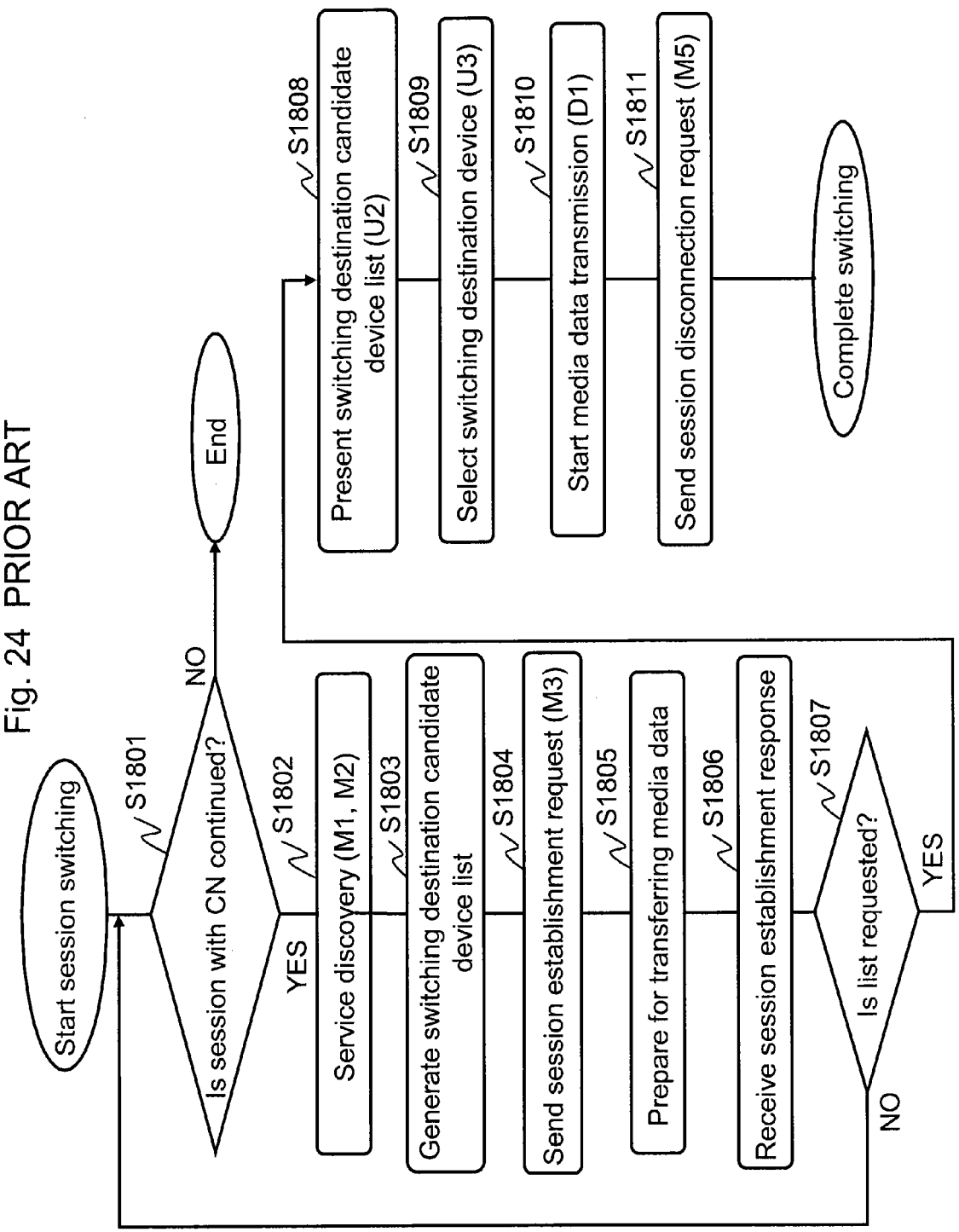
FIG. 24 is a flowchart showing a flow of an operation of a switching source device in a conventional device switching system.
Figure 25:
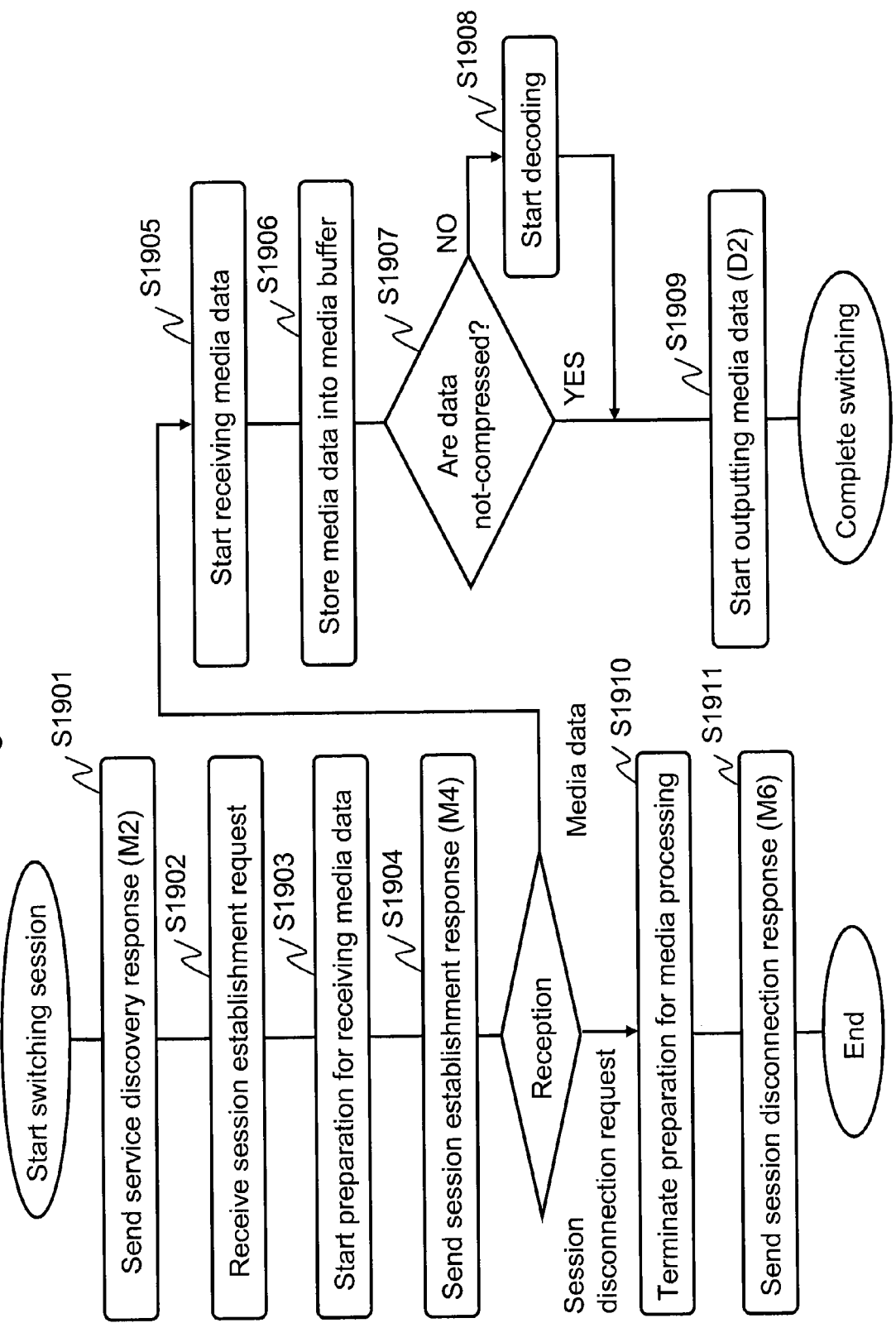
FIG. 25 is a flowchart showing a flow of an operation of a switching destination device in a conventional device switching system.
Figure 26:
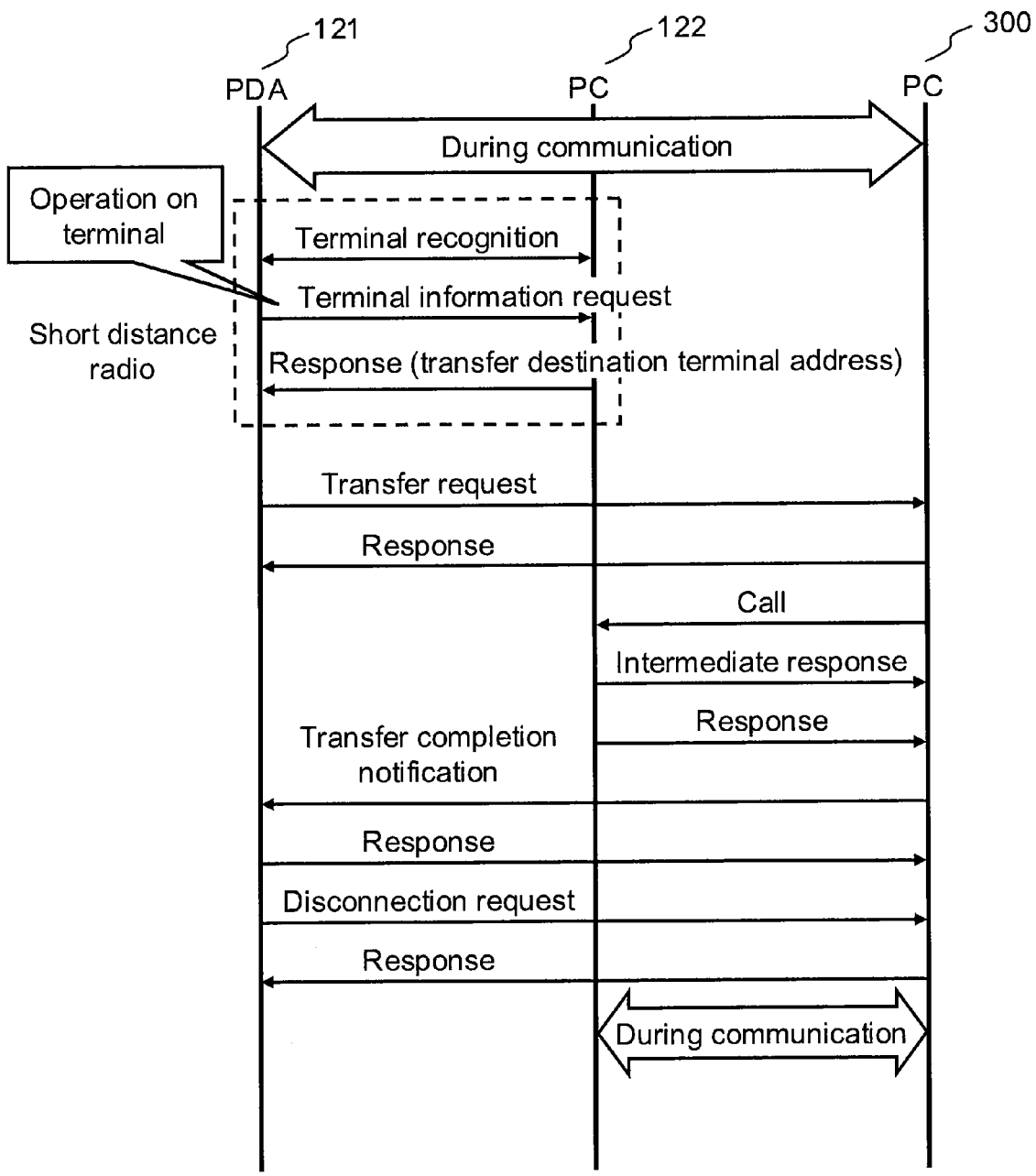
FIG. 26 a sequence diagram to illustrate a conventional device switching method.

Next, the following description relates to operations of the switching source device and the switching destination device. Firstly, an operation of the switching source device is described with reference to FIGS. 2 and 3. Unless otherwise specified, the operation is the same as that of the conventional switching source device shown in FIG. 24.

When a session with CN 1302 is continued ("YES" in step S301), high speed device switching section 101 carries out service discovery with respect to the surrounding device group 1304. In order to do so, high speed device switching section 101 sends, at an arbitrary timing, service discovery request (M1) to devices 1 to N in PAN 1305 at one time through service discovery section 1411 (step S302). Service discovery request (M1) is sent at an arbitrary timing or periodically right after a session is established. For example, it is sent at intervals of 10 minutes. On the other hand, when the session with CN 1302 is not continued ("NO" in step S301), the following operations are terminated.

Service discovery section 1411 receives service discovery response (M2) from each switching destination device and notifies high speed device switching section 101 of it (step S302). High speed device switching section 101 generates a switching destination candidate device list of devices capable of providing a service based on the notification (step S303) and holds it therein. When a switching destination candidate device list already exists, high speed device switching section 101 updates the list.

High speed device switching section 101 instructs buffer control section 102 to generate buffer control information so that the switching destination candidate device controls the media buffer of the switching destination device (step S304). Buffer control section 102 receives this instruction and generates buffer control information. Note here that the buffer control information is described later.

High speed device switching section 101 sends session establishment—media processing preparation request (M3') to switching destination candidate devices through signaling section 104 in order to establish a session and transmit media data with respect to the switching destination candidate devices described in the switching destination candidate device list (step S305). Herein, device 2 and device N are selected as the switching destination candidate device in N pieces of devices.

At this time, signaling section 104 describes media output control information in a header or a payload of session establishment—media processing preparation request (M3') message that is a signaling message. The media output control information instructs that the output section of the switching destination candidate device prohibit the output of media data transferred in the session.

Figure 16:
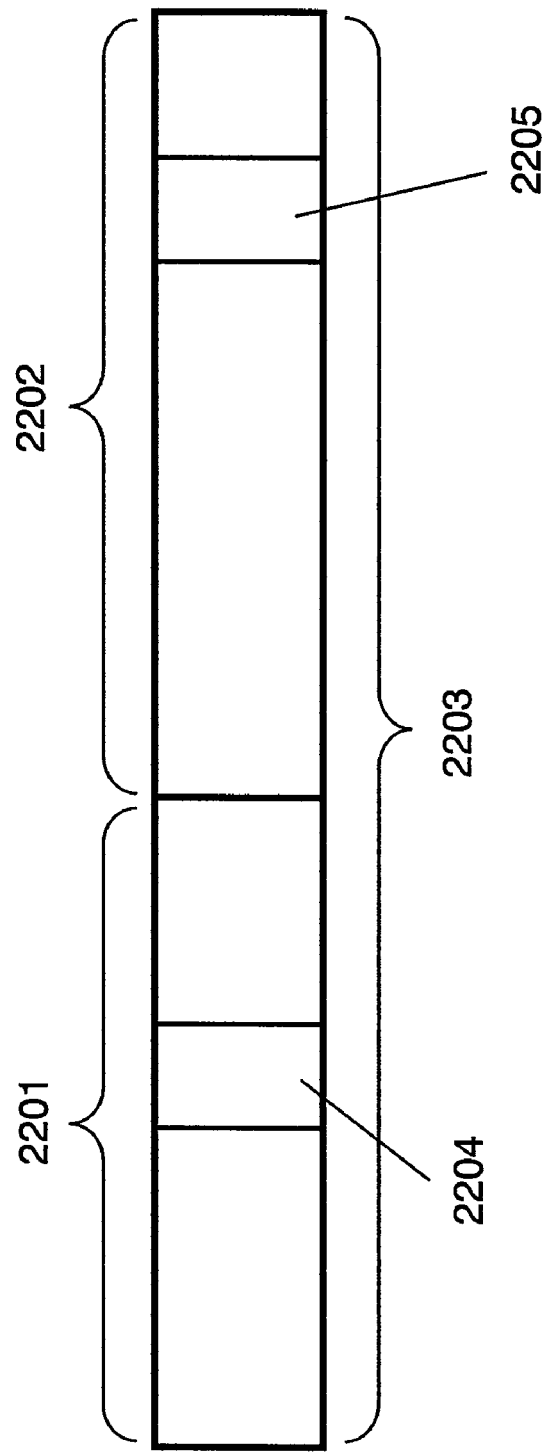
FIG. 16 is a view showing a format of a media processing preparation request (M3') message in accordance with the present invention.

Furthermore, signaling section 104 adds buffer control information generated by buffer control section 102 to a payload of session establishment—media processing preparation request (M3') message. Herein, the buffer control information is not necessarily added to the payload and it may be added to a header. FIG. 16 shows a format of session establishment—media processing preparation request (M3') message. Session establishment—media processing preparation request (M3') message 2203 includes message header 2201 and message payload 2202. FIG. 16 shows an example of the format in which media output control information 2204 is added to message header 2201 and buffer control information 2205 is added to message payload 2202.

At the same time, high speed device switching section 101 notifies media receiving section 1407 and media sending section 103 to start preparation for transferring the received media data and the media data stored in media buffer 1408 to switching destination candidate devices (step S306).

Next, when signaling section 104 receives session establishment—media processing preparation response (M4) from the switching destination candidate device (step S307), high speed device switching section 101 notifies media sending section 103 to start transmission (D1') of the media data (step S308). The media data include media data stored in media buffer 1408 and media data received by media receiving section 1407 from CN 1302.

Media sending section 103 receives this notification and starts transferring media data (D1') to the switching destination candidate devices described in the switching destination candidate device list by multicast or broadcast, and high speed device switching section 101 is in a waiting state for a predetermined time.

While high speed device switching section 101 is in a waiting state, when the switching destination candidate device display request (U1) is not sent from a user ("NO" in step S309), the step goes back to step S301 and carries out the service discovery again. On the other hand, when the switching destination candidate device display request (U1) is sent from a user ("YES" in step S309), high speed device switching section 101 presents the switching destination candidate device list (U2) held therein to a user through output section 1403 (step S310).

A user selects a switching destination device (U3) from the switching destination candidate device list through input section 1404 (step S311). The selected switching destination device is notified to high speed device switching section 101 via operating system 1405. Herein, as a switching destination determined device, device 2 is selected.

High speed device switching section 101 sends the media data output notification (M7) to device 2 through signaling section 104 so that switching destination device 2 selected as the switching destination device starts outputting media data (step S312).

When media sending section 103 carries out burst transmission mentioned below, high speed device switching section 101 adds a media data situation, showing a situation in which media buffer 1408 generated by buffer control section 102 is used, to a payload of the media data output notification (M7). However, the media data situation is added not necessarily to the payload and it may be added to a header.

High speed device switching section 101 sends session disconnection request (M5) through signaling section 104 to devices other than device 2 selected by a user among the switching destination candidate devices (step S313). Then, high speed device switching section 101 receives session disconnection response (M6) from these devices and completes the switching operation.

Next, an operation of the switching destination device is described with reference to FIG. 4.

Service response section 1511 of the switching destination device that has received service discovery request (M1) judges whether or not the service condition shown in the service discovery request is satisfied. Then, when a service suitable for the service condition can be provided, service discovery section 1411 sends service discovery response (M2) including procedure for using the service to MN 1301 (step S401).

Next, when signaling section 104 of the switching destination candidate device receives session establishment—media processing preparation request (M3') from the switching source device (step S402), media output control information and buffer control information are extracted from the message and sent to high speed device switching section 101. High speed device switching section 101 recognizes from the media output control information that the output of media data transferred in the session to the output section is prohibited. Then, high speed device switching section 101 instructs media receiving section 1407, media buffer 1408 and decoder 1409 to start preparation for receiving media and preparation for processing (step S403). The received buffer control information is sent to buffer control section 102 from high speed device switching section 101 and used for controlling media buffer 1408.

When these preparations are completed, high speed device switching section 101 sends session establishment response (M4) to the switching source device through signaling section 1410 (step S404).

Next, media receiving section 1407 of switching destination device 2 receives media data (D1') transferred by the switching source device by multicast or broadcast (step S405), and starts storing media data into media buffer 1408 (step S406). High speed device switching section 101 sends buffer control information to buffer control section 102. By using this information, buffer control section 102 controls so that the storage state of media data of media buffer 1408 is the same as that of the media buffer of the switching source device. Herein, the term "the storage state of media data is the same" denotes that, for example, in the case of a moving picture, the number of stored frames or the stored frame number is exactly the same.

When high speed device switching section 101 of switching destination device 2 receives media data output notification (M7) sent from the switching source device through signaling section 104, it recognizes that device 2 is selected as a switching destination device. Then, high speed device switching section 101 releases the output of media data to output section 1403, which has been prohibited by the media output control information, and proceeds processing as a switching destination determined device (step S407). When the media data are sent by burst transmission mentioned below, high speed device switching section 101 sends a media data situation added to media data output notification (M7) to buffer control section 102. By using the information of the media data situation, buffer control section 102 controls so that the state of media data of media buffer 1408 is the same as the state of the media buffer of the switching source device.

When signaling section 104 of the switching destination candidate devices other than switching destination device 2 designated by a user receives session disconnection request (M5) sent from the switching source device, high speed device switching section 101 instructs media receiving section 2107 to terminate the reception of media data. Furthermore, high speed device switching section 101 instructs media buffer 1408 and decoder 1409 to terminate the media processing preparation (step S 411).

When the media processing preparation is terminated, high speed device switching section 101 sends session disconnection response (M6) to the switching source device through signaling section 1410 (step S412) so as to terminate the switching operation.

In step S407, when predetermined media data are stored in media buffer 1408, when the media data are not compressed ("YES" in step S408), high speed device switching section 101 sends media data (D2) stored in media buffer 1408 to output section 1403 via operating system 1405 (step S410).

On the other hand, when the media data are compressed ("NO" in step S408), high speed device switching section 101 notifies decoder 1409 to start a decoding operation (step S409). Decoder 1409 sends the decoded media data to output section 1403 via operating system 1405. Output section 1403 starts outputting the received media data (D2) (step S410) so as to complete the switching operation.

As mentioned above, in the high speed device switching system in accordance with the first exemplary embodiment of the present invention, before a switching destination candidate device list request is input into the switching source device from a user, the switching source device has retrieved the switching destination candidate devices and stores media data therein. Therefore, when the device switching request is input from a user, the already retrieved switching destination candidate device can be displayed and the switching destination determined device selected by the user can output the already stored media data immediately. Thus, a time that elapses from the time when a user intends to switch devices to the time when data are output in the switching destination device can be made 100 milliseconds or less. It is possible to realize device switching at a high speed such that the user cannot perceive it.

Next, FIGS. 17 and 18 show an example in which the media output control information which signaling section 104 describes in signaling message (M3') is SIP. Session establishment—media processing preparation request (M3') message 2203 includes message header 2201 and message payload 2202 similar to that shown in FIG. 16. FIGS. 17 and 18 show the details of SIP header and payload. In SIP, for signaling message (M3'), an INVITE method is used, and the header field of the Require header or Supported header thereof is described as follows. FIG. 17 shows an example in which a Require header is used as media output control information 2204.

Require: Media—Buffering—Only
Supported: Media—Buffering—Only wherein "Media—Buffering—Only" denotes a defined option tag.

As another example, the header field of the Contact header of the INVITE method is described as follows.

Contact: <sips:alice@client.ndc.example.com>;audio; video;mobility="fixed"; Mediahandling="bufferonly"

wherein "mediahandling" is a defined media feature tag.

Furthermore, as another example using SDP (Session Description Protocol) that is one of the payloads in SIP, the attribute of SDP is described as follows. FIG. 18 shows an example in which the attribute is used as media output control information 2204.

a=bufferOnly wherein "bufferOnly" shows the defined attribute and that only storage is permitted.

When such media output control information is described in signaling message (M3'), high speed device switching section 101 of the switching source device recognizes that the media data transmitted in the session aim to be stored in media buffer 1408 and are prohibited from being outputted to output section 1404.

Next, operations of media buffer 1408 of the switching source device and buffer control section 102 controlling the storage of media data (step S304) and an operation of media sending section 103 for transmitting media data stored in media buffer 1408 of the switching source device (step S308) are described in detail.

Firstly, a method of transmitting media data by media sending section 103 is described with reference to FIGS. 5 and 6. The way of transmitting media data is classified into two based on the size relation of a network band between a switching source device (MN 1301, and the like) and a communication counterpart (CN 1302, and the like), with respect to a network band (hereinafter, referred to as "band of PAN") between the switching source device (MN 1301, and the like) and switching destination devices (device group 1304).

When the band of PAN is larger than the network band between the switching source device and the communication counterpart, media sending section 103 carries out burst transmission of media data. Herein, the burst transmission denotes a method which waits a transmission operation until data stored in the media buffer reach a predetermined amount and then sends data at one time in a batch when the amount reaches the predetermined amount. For example, in the case where media are moving pictures, a plurality of frames of data are sent together.

Figure 5B:
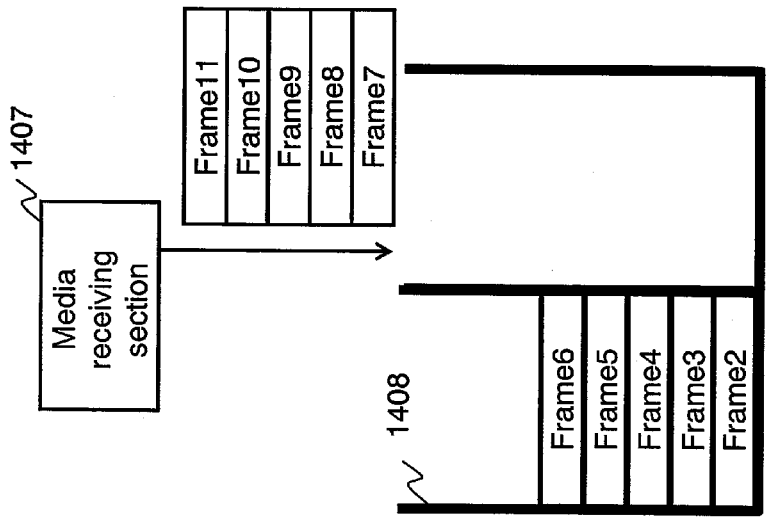
FIG. 5B is a view to illustrate a way of receiving media data and a way of controlling a buffer when the switching destination device receives media data by burst transmission in the high speed device switching system in accordance with the first exemplary embodiment of the present invention.
Figure 5A:
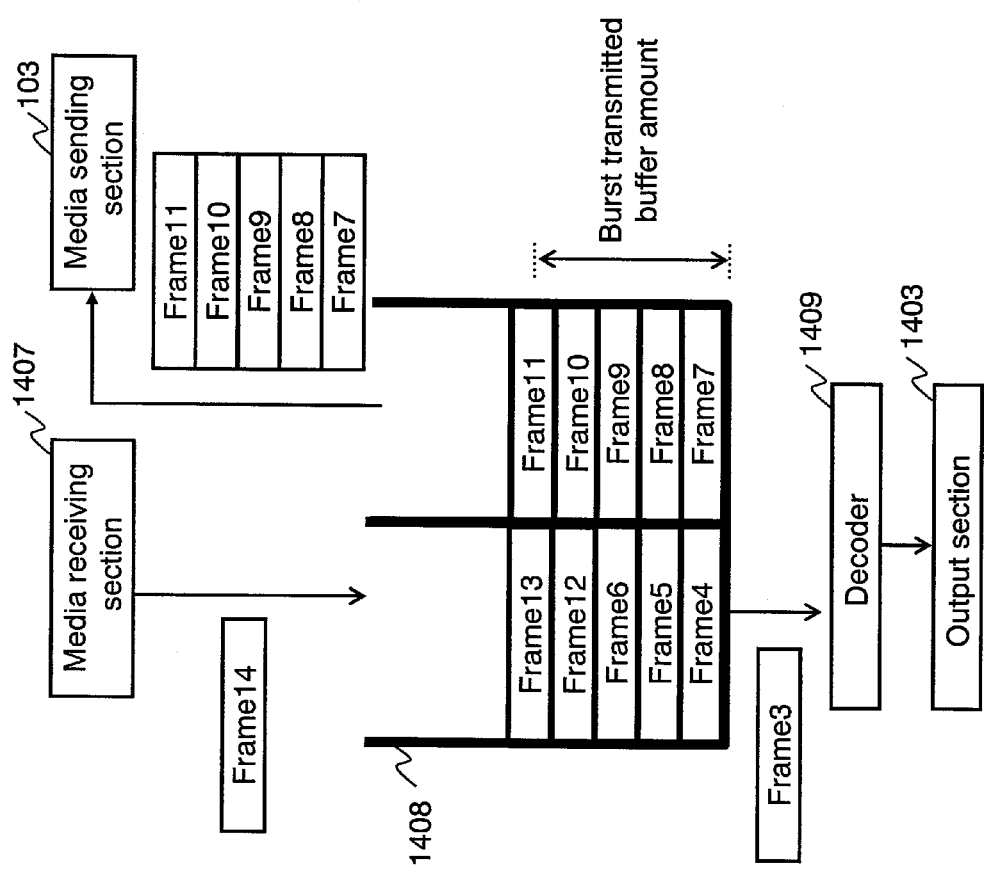

FIGS. 5A and 5B are views to illustrate a way of storing media data in media buffer 1408 and transmitting media data by media sending section 103 when the burst transmission is carried out. FIGS. 5A and 5B show component elements necessary for description, which are extracted from the internal configuration of the switching source device shown in FIG. 1. The same reference numerals are given to the component elements common to those in FIG. 1.

FIG. 5A shows a configuration of the switching source device and FIG. 5B shows a configuration of the switching destination device. FIGS. 5A and 5B show a detailed state of media data stored in media buffer 1408. The media used for description in FIGS. 5A and 5B are compressed moving pictures and frame number is given for each frame. Media buffer 1408 of the switching source device shown in FIG. 5A is in a state in which frames 4 to 13 are stored. At this time, frame 14 is received by media receiving section 1407 and is being newly added to media buffer 1408. Furthermore, frame 3 is to be sent from media buffer 1408 to decoder 1409, decoded in decoder 1409 and then output from output section 1403. Media buffer 1408 of the switching destination device shown in FIG. 5B is logically divided into two buffers for burst transmission. The data storage amount of one of the logical buffers is set to be beyond a predetermined burst transmitted buffer amount.

Next, media sending section 103 sends data (frames 7 to 11 in FIGS. 5A and 5B) to the switching destination devices by way of PAN 1305 at one time in a batch. Herein, the burst transmitted buffer amount is a lower limit of the amount of data sent by one burst transmission. The burst transmission is carried out when the data stored in a logical buffer of media buffer 1408 of the switching source device exceed the burst transmitted buffer amount. Also when the burst transmission is carried out, data are input into media buffer 1408 and data are output from media buffer 1408 to decoder 1409. However, since media buffer 1408 has two logical buffers, when the burst transmission is carried out, the input data (frames 12, 13 and 14 and the like) are stored in a logical buffer in which the burst transmission is not carried out. Furthermore, output data (frames 3, 4, 5 and the like) are stored in a logical buffer in which the burst transmission is not carried out and output from the logical buffer. Therefore, data of the logical buffer at the side relating to the burst transmission (a logical buffer at the right side of FIG. 5A) is not affected by the data input/output in media buffer 1408 when burst transmission is carried out. Media receiving section 1407 of the switching destination device receives the media data and stores the data in one of the logical buffers. The timing at which frames are output to decoder 1409 in media buffer 1408 of the switching source and the timing at which frames are output or discarded in media buffer 1408 of the switching destination follow the buffer control policy mentioned below. The media buffer control of the switching source device by buffer control section 1408 is carried out as follows. When frame 14 is input into the logical buffer in which frames 12 and 13 are stored and frames up to 6 are output to decoder 1409, frames 7 and 8 are output from the other buffer sequentially in this order.

On the contrary, when the band of PAN 1305 is smaller than the network band between the switching source device and the communication counterpart, media sending section 103 carries out sequential transmission of media data. Herein, the sequential transmission is a method of sending data at a constant interval without carrying out the waiting of a sending operation.

For example, in the case where media are moving pictures, one frame of data is sequentially sent.

Figure 6B:
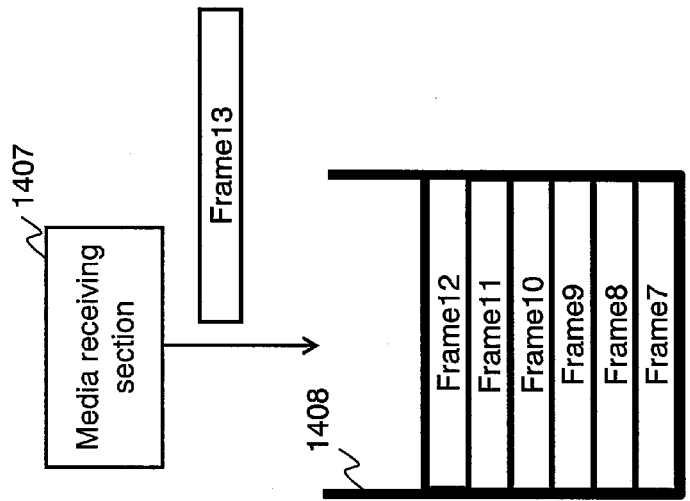
FIG. 6B is a view to illustrate a way of receiving media data and a way of controlling a buffer when the switching destination device receives media data by sequential transmission in the high speed device switching system in accordance with the first exemplary embodiment of the present invention.
Figure 6A:
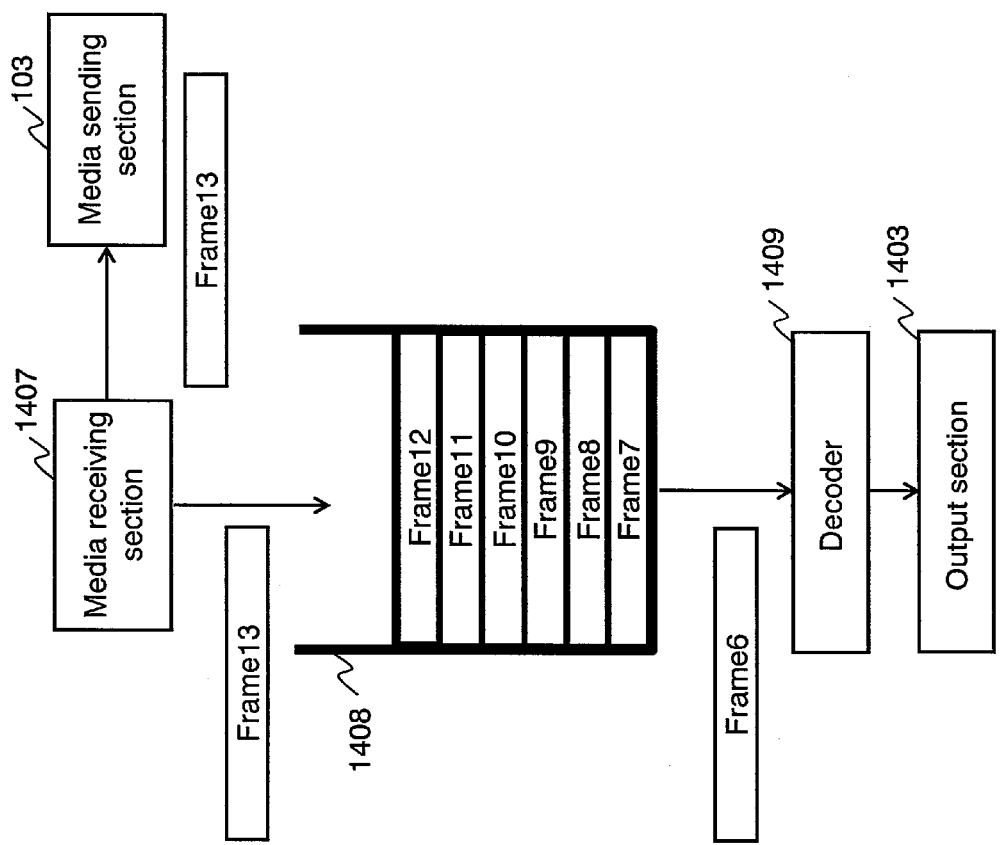
FIG. 6A is a view to illustrate a way of transmitting media data and a way of controlling a buffer when the switching source device transmits media data by burst transmission in the high speed device switching system in accordance with the first exemplary embodiment of the present invention.

FIGS. 6A and 6B are views to illustrate a way of storing media data in media buffer 1408 and transmitting media data by media sending section 103 when sequential transmission is carried out. Similar to FIGS. 5A and 5B, FIGS. 6A and 6B show only necessary component elements, which are extracted from the internal configuration of the switching source device shown in FIG. 1. The same reference numerals are given to the common component elements common to those in FIG. 1.

FIG. 6A shows a configuration of the switching source device, and FIG. 6B shows a configuration of the switching destination device. FIGS. 6A and 6B show a detailed state of media data stored in media buffer 1408. The media used for description in FIG. 6 is a compressed moving picture and frame number is given for each frame. Media buffer 1408 of the switching source device shown in FIG. 6A is in a state in which frames 7 to 12 have been stored. At this time, when frame 13 is received by media receiving section 1407, it is newly added to media buffer 1408 and media sending section 103 sequentially sends the received frame to the switching destination device by way of PAN 1305. Furthermore, frame 6 is sent from media buffer 1408 to decoder 1409, decoded in decoder 1409 and then output from output section 1403.

Media receiving section 1407 of the switching destination device shown in FIG. 6B receives the sent media data and stores them in media buffer 1408. The timing at which frames are output to decoder 1409 in media buffer 1408 of the switching source device and the timing at which frames are output or discarded in media buffer 1408 of the switching destination follow the buffer control policy mentioned below. The media buffer control of switching source device 102 is output carried out as follows. Following frame 12, frame 13 is input into media buffer 1408. Following frame 6, frames 7 and 8 are output from media buffer 1408 in this order.

Next, the buffer control policy is described.

The buffer control policy includes two basic types. Practically, the two basic policies are combined and used as a new buffer control policy. The first basic type is a buffer amount constant control type. In this type, when new data are input and the data amount exceeds a predetermined reference buffer amount, unit data such as one frame of data are output. The reference buffer amount is a predetermined amount of data to be stored in a buffer. Therefore, the amount of data stored in the buffer can be always kept at constant. The buffer amount constant control type can reduce the amount of data stored in the buffer by reducing the reference buffer amount. Thus, it is possible to reduce the delay with respect to a communication counterpart. Therefore, this type is often used in real-time communication such as a TV telephone. The disadvantage is that this type is susceptible to jitter of the network, and when the intervals of data arrival are increased, data output may be interrupted.

The second basic type is an output time constant control type. In this type, when a predetermined time has passed, unit data such as one frame of data are output. Therefore, the amount of data stored in the buffer largely varies depending upon data arrival situations. However, in general, by securing the amount of data stored in the buffer at the format time, data underflow can be prevented. The output time constant control type is excellent in reproducing state since the output timing is constant. Therefore, this type is often used in a streaming application such as video on demand (VOD). The disadvantage of this type is that the amount of data stored in the buffer may be increased, thus increasing the delay.

Actually, in view of the respective advantages and disadvantages, these two buffer control policies are combined with each other and used as a new control policy. For example, an operation is usually carried out in the buffer amount constant control type, and when the arrival of data is extremely delayed, the operation is carried out in the output time constant control type. For example, in the case where new data are not arrived even after 303 milliseconds, i.e., an output reference of the output time constant control type, have passed since the arrival of the previous data, data are output. As another example, an operation is usually carried out in the output time constant control type and in the case where the data stored in the buffer is reduced to less than a predetermined amount, controlling is carried out in the buffer amount constant control type. That is to say, when the delay of the data arrival is continued for a while, the amount of data stored in the buffer is less than the reference of the buffer amount constant control type, the output is not carried out even after 303 milliseconds, i.e., a reference for output, have passed. When next data are arrived and the buffer amount is recovered, the output is carried out again.

Media sending section 103 of the switching source device transmits media data by the above-mentioned method. Furthermore, buffer control section 102 of the switching source device carries out storage control with respect to media buffer 1408 based on the predetermined buffer control policy.

Next, an operation of buffer control section 102 (step S406) is described in detail. Note here that buffer control section 102 carries out the storage control so that the state of media buffer 1408 of the switching destination candidate device, which has received media data transferred by the switching source device, becomes the same as that of media buffer 1408 of the switching source device.

Buffer control section 102 of the switching destination candidate device controls media buffer 1408 based on the buffer control information sent from switching source device. FIG. 7 is a table showing buffer control information classified by the method for transmitting media data and the buffer control policy used in the high speed device switching system in accordance with this exemplary embodiment of the present invention.

In FIG. 7, the buffer control policy is just a basic type. Practically, as mentioned above, a new buffer control policy obtained by combining the basic types can be used. Furthermore, the media data transmission is also just a basic type. As mentioned above, practically, burst transmission may be firstly carried out until predetermined amount of media data are stored in the media buffer, and then the burst transmission may be switched to sequential transmission after data are stored. Herein, three cases of buffer control information shown in Table in FIG. 7 and buffer control methods using the same are described.

When the transmission of media data is carried out by burst transmission and the buffer control policy is the output time constant control type, media control information includes a reference output time interval and a burst transmission buffer amount. With reference to an example shown in FIGS. 5A and 5B, an operation of buffer control section 102 is described. Herein, the reference output time interval means a time from the time when unit data stored in the media buffer are output to the time when the next data are output. In FIG. 5A, after frame 3 is output to decoder 1409, when the reference output time interval has passed, frame 4 is to output. Furthermore, based on the burst transmitted buffer amount, the upper limit of the data transmitted by burst transmission is estimated and, a logical buffer of media buffer 1408 is formed. As the upper limit data amount, for example, an amount obtained by adding the maximum code amount at the time when one frame is compressed to the burst transmitted buffer amount is estimated.

In FIG. 5B, media receiving section 1407 of the switching destination stores frames 2 to 6 that have been burst transmitted previously from the switching source device to one of the logical buffers, and stores frames 7 to 11 that are burst transmitted at this time to the other logical buffer. When buffer control section 102 of the switching destination candidate device receives notification from the switching source device that media data output is started (M7) (step S407), it discards frames up to 4 (frames 2 and 3) based on the information added to the message on the media data situation (for example, a situation in which frames up to 3 are already output) of the media buffer of the switching source device. Furthermore, buffer control section 102 starts up the internal timer and outputs frame 4 when the reference output time interval has passed. When buffer control section 102 terminates the output of frame 6, it outputs frame 7 and later frames sequentially from the other logical buffer. Subsequently, when the following burst transmission is carried out from the switching source device, buffer control section 102 stores media data in an empty logical buffer. Thus, media buffer 1408 of the switching destination candidate device becomes completely the same state as that of media buffer 1408 of the switching source device.

On the other hand, when the media data transmission is carried out by sequential transmission and the buffer control policy is the buffer amount constant control type, media control information is only a reference buffer amount. With reference to an example shown in FIG. 6B, an operation of buffer control section 102 is described.

Media buffer 1408 of the switching destination candidate device is controlled based on the reference buffer amount. When frame 12 is input and the amount of data (frame 6 to 12) stored in media buffer 1408 exceeds the reference buffer amount, frame 6 is discarded. Buffer control section 102 of the switching destination device discards frame 7 if the amount of stored data exceeds the reference buffer amount by the input of frame 13 that is to be sequentially transmitted this time. Thus, media buffer 1108 of the switching destination candidate device becomes completely the same state as media buffer 1408 of the switching source. When buffer control section 102 of the switching destination candidate device receives from the switching source device notification that media data output is started (M7) (step S407), it terminates discarding of frames and switches the operation to outputting to decoder 1409.

When media data transmission is carried out by sequential transmission and the buffer control policy is the output time constant control type, media control information includes a reference output time interval and a storage data amount. With reference to an example shown in FIGS. 6A and 6B, an operation of buffer control section 102 is described. Herein, the storage data amount is an amount of data stored in the media buffer of the switching source device at the time the media control information is generated (unit is unit data such as frame number). In FIG. 6A, the storage data amount is six frames. Buffer control section 102 starts up the internal timer and recognizes the time to discard or output frames stored in media buffer 1408 based on the reference output time interval and the storage data amount. For example, frame 13 is discarded after the time of a reference output time interval× storage data amount has passed. Thus, the state of media buffer 1408 of the switching destination candidate device becomes completely the same state as media buffer 1408 of the switching source device. Herein, when buffer control section 102 of the switching destination candidate device receives notification from the switching source device that media data output is started (M7) (step S407), it terminates the discarding of frames and switches the operation to outputting to decoder 1409.

Thus, buffer control section 102 of the switching destination candidate device controls the storage so that the state of media buffer 1408 of the switching destination candidate device becomes the same as that of media buffer 1408 of the switching source device.

As mentioned above, when the switching source device in accordance with the first exemplary embodiment of the present invention establishes a session with the switching destination candidate device, since the buffer control information is notified in a state in which it is added to a message, the switching destination candidate device can make the state of the media buffer be the same as that of the switching source device. Therefore, when the switching destination candidate device is determined to be a switching destination device, it is possible to realize the device switching that maintains the continuity of the media data without increasing a communication delay.

Note here that the media output control information in accordance with the exemplary embodiment of the present invention can be used for the purpose other than the high speed device switching.

For example, when a user receives a TV telephone, in the case where it is inconvenient that the user's state is informed to a communication counterpart, for example, in the case where the user is changing clothes, in establishing a session with the TV telephone terminal of the communication counterpart, this media output control information is sent. Thus, an instruction is made so that even when the TV telephone terminal of the communication counterpart receives a picture, the output thereof is prohibited. Therefore, the received picture is not output to the TV telephone terminal of the counterpart. Thereafter, when the user finishes changing clothes and the inconvenience is resolved, media data output notification (M7) is sent from the user's TV telephone terminal to the TV telephone terminal of the communication counterpart, so that the user's picture can be output on the TV telephone terminal immediately.

Figure 8:
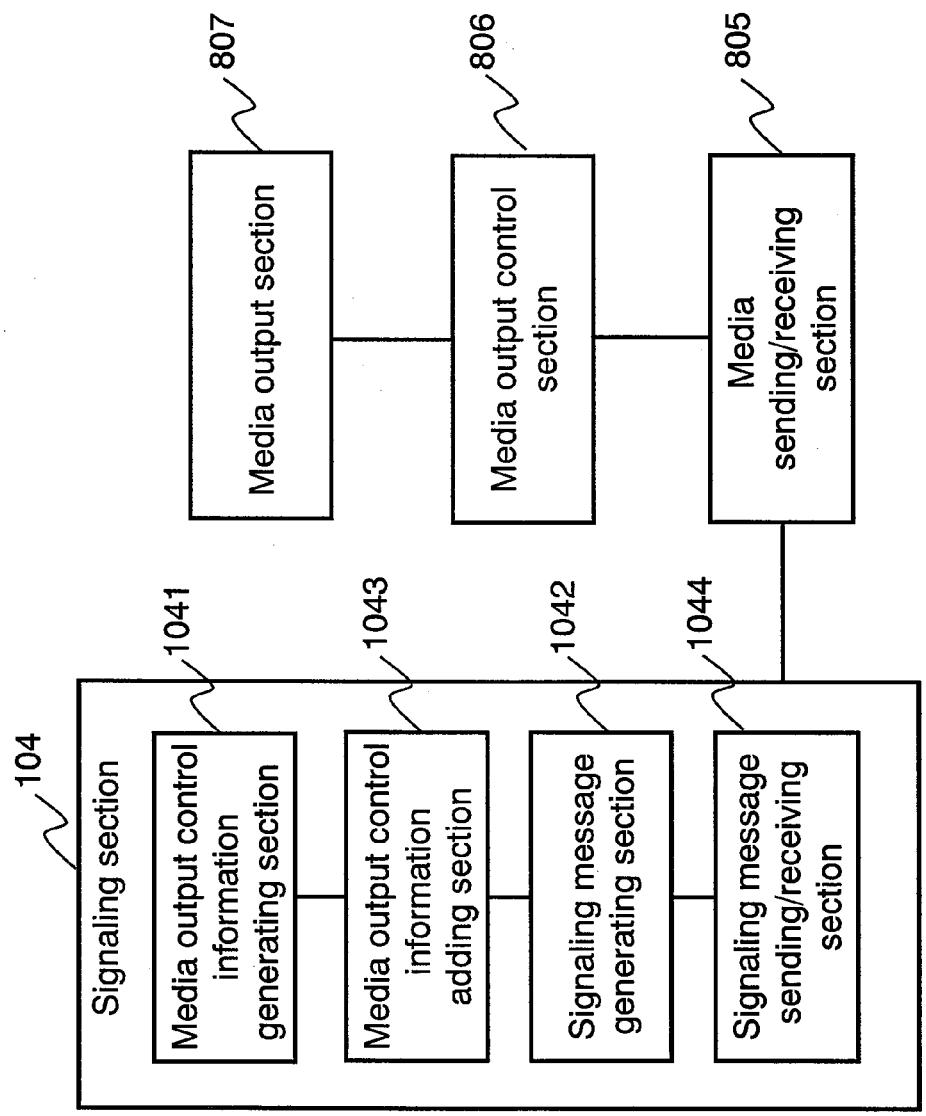
FIG. 8 is a block diagram showing a configuration of a device for executing a signaling method in the high speed device switching system in accordance with the first exemplary embodiment of the present invention.

FIG. 8 shows a configuration of a TV telephone terminal. The TV telephone terminal includes signaling section 104 for establishing a TV telephone session with a TV telephone terminal of a communication counterpart; media sending/receiving section 805 for sending and receiving picture/voice media; media output control section 806 for controlling the output of the picture/voice media received from the communication counterpart; and media output section 807 for outputting the picture/voice media. Signaling section 104 includes media output control information generating section 1041 for generating media output control information showing that output of media data is prohibited; signaling message generating section 1042; media output control information addition section 1043 for adding the media output control information to the generated signaling message; and signaling message sending/receiving section 1044.

Figure 9:
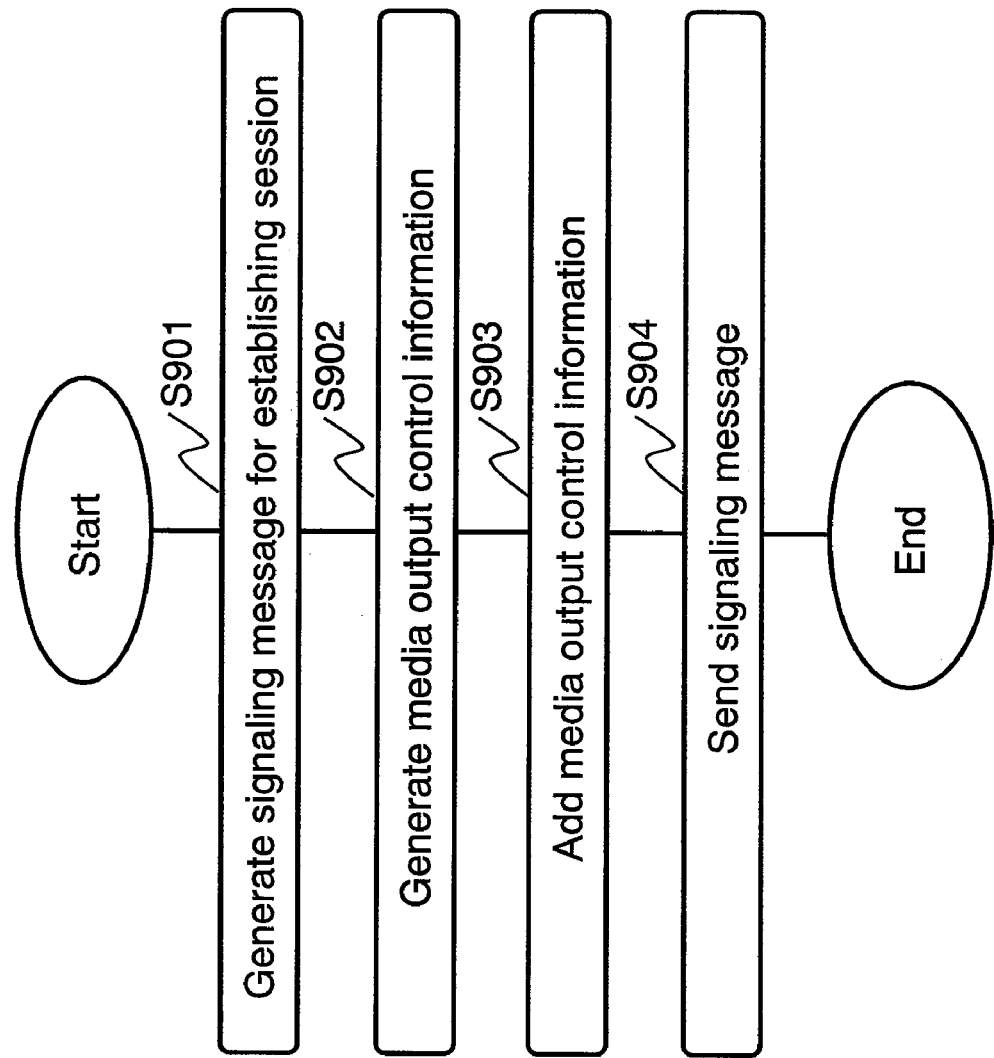
FIG. 9 is a flowchart showing a flow of an operation of the device for executing the signaling method in the high speed device switching system in accordance with the first exemplary embodiment of the present invention.

Next, an operation of the TV telephone terminal is described with reference to FIG. 9.

Signaling message generating section 1042 generates a signaling message for establishing a session with the TV telephone terminal of a communication counterpart (step S901). Media output control information generating section 1041 generates media output control information showing that the output of image data received by the TV telephone terminal of the communication counterpart is prohibited (step S902). Media output control information addition section 1043 adds the generated media output control information to a payload or a header of the signaling message (step S903). Signaling message sending/receiving section 1044 sends the signaling message to the TV telephone terminal of the communication counterpart (step S904).

On the other hand, the TV telephone terminal of the communication counterpart receives the signaling message, then establishes a TV telephone session, and starts to send and receive the picture/voice media. However, the media output control section of the TV telephone terminal of the communication counterpart does not output image data to the media output section according to the media output control information added to the signaling message.

As mentioned above, the media output control information can be used for the purpose other than the high speed switching device.

Second Exemplary Embodiment

The configuration of a high speed device switching system in accordance with a second exemplary embodiment of the present invention is the same as that shown in the first exemplary embodiment except that a switching source device is different from that of the first exemplary embodiment.

Figure 10:
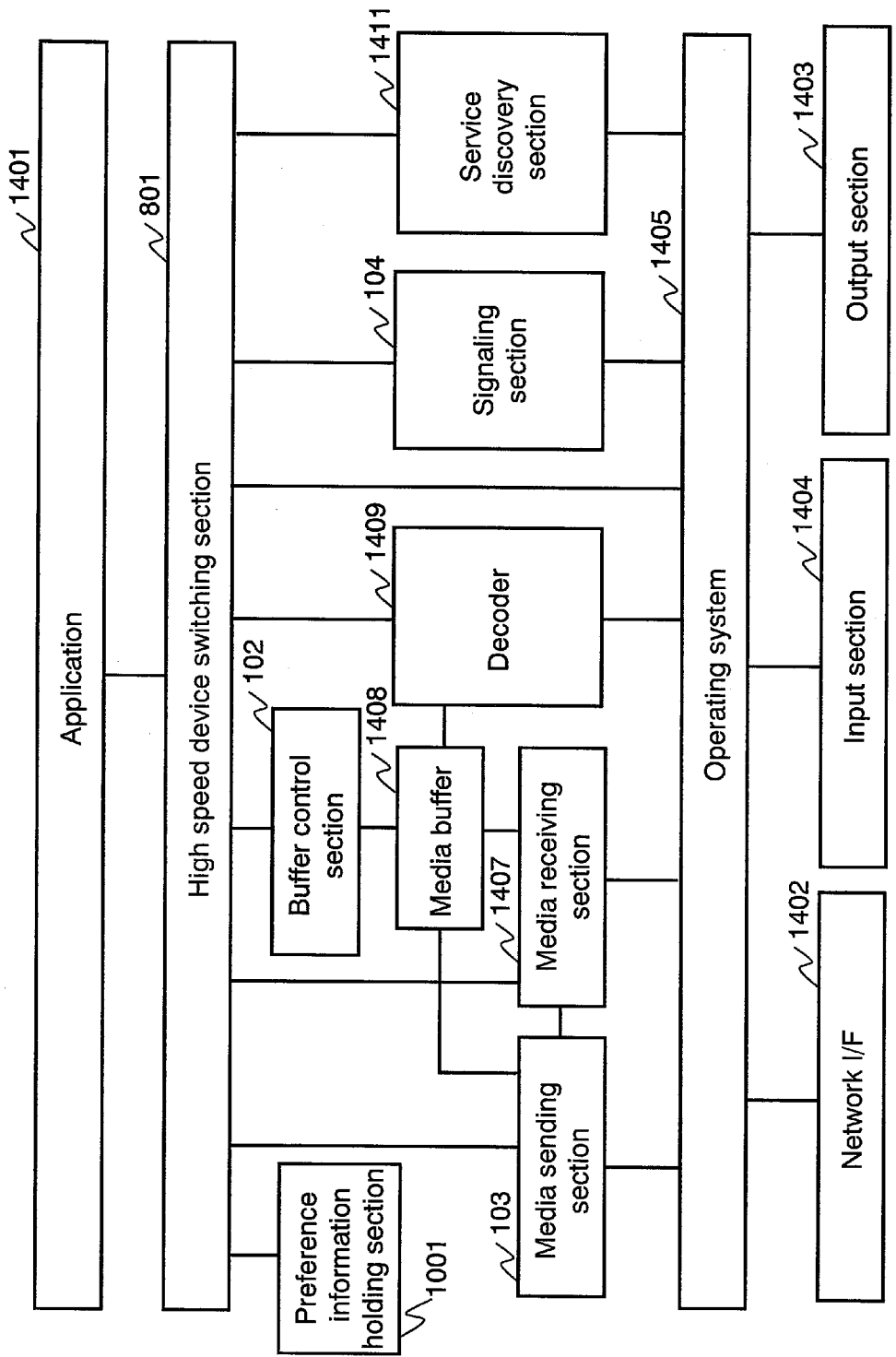
FIG. 10 is a block diagram showing a configuration of a switching source device in a high speed device switching system in accordance with a second exemplary embodiment of the present invention.

FIG. 10 is a diagram showing a configuration of the switching source device in accordance with the second exemplary embodiment. FIG. 10 is different from the switching source device of the first exemplary embodiment in that preference information holding section 1001 is provided and a section of the function of high speed device switching section 801 is different. Preference information holding section 1001 holds previously set user's preference information. Note here that the same reference numerals are given to the component elements having the same operation.

Figure 11:
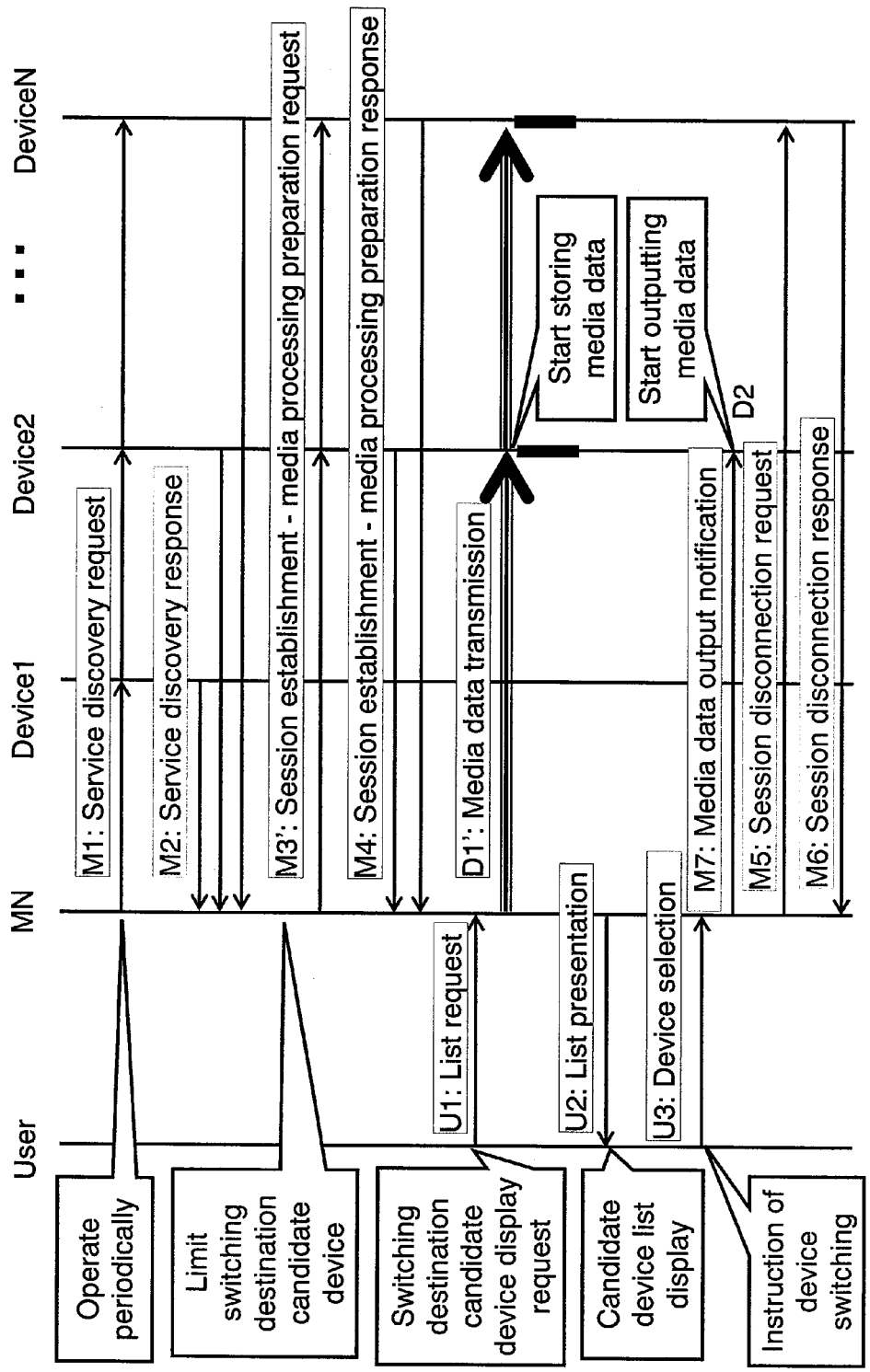
FIG. 11 is a sequence diagram showing a message exchange between the switching source device and a switching destination device group in the high speed device switching system in accordance with the second exemplary embodiment of the present invention.

FIG. 11 is a view showing a message sequence between a switching source device and a switching destination device group. FIG. 11 is different from the message sequence of the first exemplary embodiment in that the order of the processing in which a user makes an instruction of switching destination candidate device display request (U1) to MN that is a switching source device and the processing of media data transmission (D1') from MN that is a switching source device to the switching destination candidate devices (device 2, device N) are exchanged.

Figure 12:
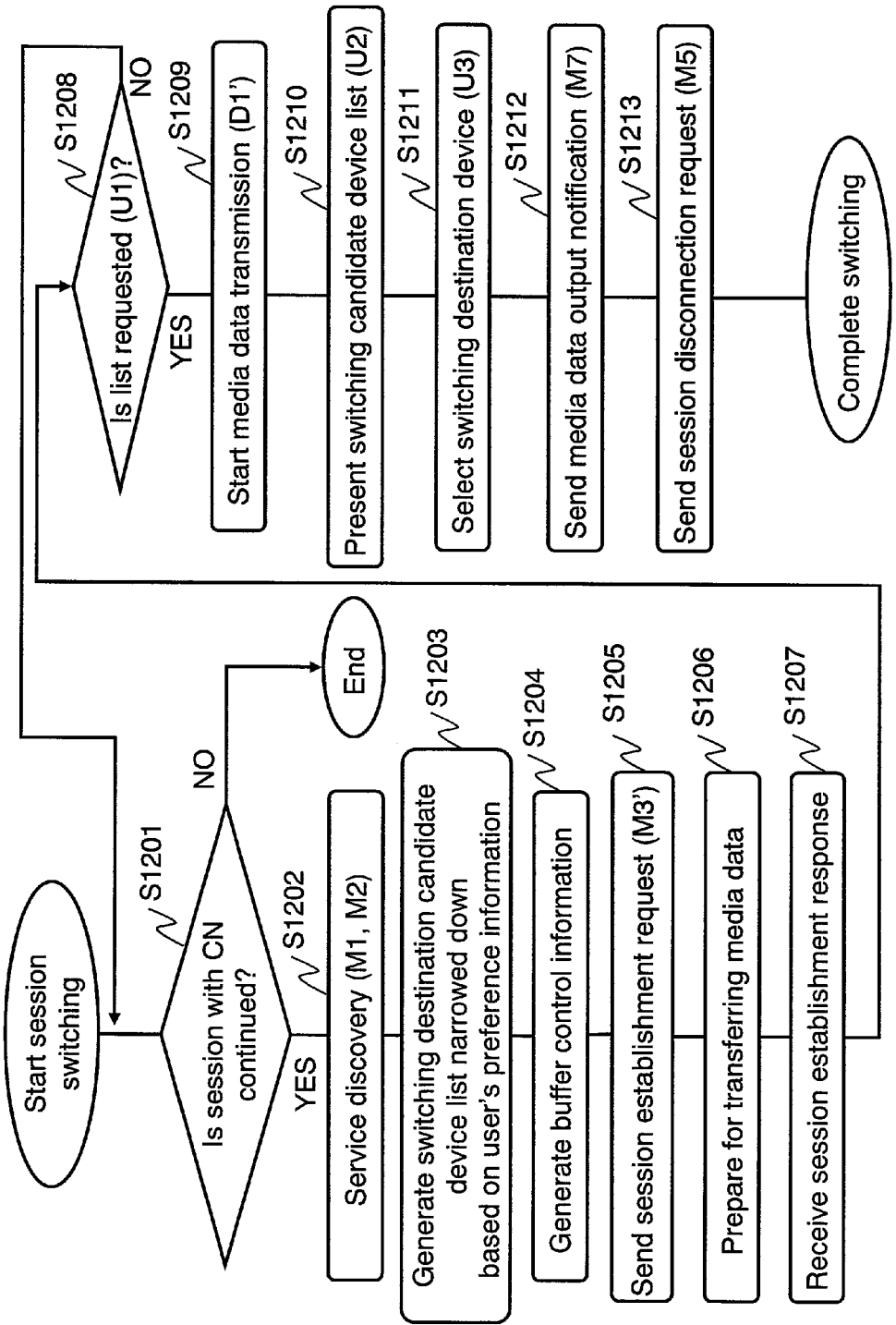
FIG. 12 is a flowchart showing a flow of an operation of the switching source device in the high speed device switching system in accordance with the second exemplary embodiment of the present invention.

FIG. 12 is a flowchart showing an operation of the switching source device.

With FIGS. 11 and 12, processing of device switching in accordance with this exemplary embodiment is described hereinafter.

In FIG. 12, similar to the switching source device of the first exemplary embodiment, service discovery section 1411 receives service discovery response (M2) from the switching destination device and notifies high speed device switching section 801 of it. High speed device switching section 801 reads the previously set user's preference information from preference information holding section 1001 and, based on this, narrows down the device responding that a service can be provided. The preference information is, for example, detailed information such as size of a display. Then, high speed device switching section 801 generates a switching destination candidate device list based on the preference information (step S1203) and holds the list therein. When a switching destination candidate device list already exists, high speed device switching section 801 updates the list.

Next, similar to the switching source device of the first exemplary embodiment, high speed device switching section 801 generates buffer control information (step S1204) and sends session establishment request (M3') including media control information and buffer control information to switching destination candidate device (step S1205). At the same time, high speed device switching section 801 notifies media sending section 103 of the media data transfer preparation (step S1206).

Next, when high speed device switching section 801 receives a session establishment response from the switching destination candidate device, it waits for switching destination candidate device display request (U1) from a user (step S1208). During this time, when an instruction of switching destination candidate device display request (U1) is not sent from a user ("NO" in step S1208), the service discovery processing is carried out again (step S1201).

On the other hand, when an instruction of switching destination candidate device display request (U1) is sent from a user ("YES" in step S1208), high speed device switching section 801 notifies media sending section 103 to start media data transmission (D1') with respect to the switching destination candidate device (step S1209). The media data include data stored in media buffer 1408 and data received from CN through media receiving section 1407.

Media sending section 103 receives this notification and starts transferring media data to the narrowed-down switching destination candidate devices described in the switching destination device list by multicast or broadcast.

Next, high speed device switching section 801 presents (U2) the switching destination candidate device list held therein to output section 1403 via operating system 1405 (step S1210).

The following processing (steps S1211 to S1213) is the same as the processing (steps S 311 to S313) in the first exemplary embodiment.

As mentioned above, since high speed device switching section 801 of the switching source device narrows down the switching destination candidate devices based on the previously set user's preference information, as compared with the method of the first exemplary embodiment, the number of the switching destination candidate devices receiving media data can be reduced. Thus, power consumption used by the switching destination candidate device in receiving media data and a network resource used by the switching destination candidate device in receiving media data can be reduced in total by the reduced amount of the switching destination candidate devices. Furthermore, a user may select a switching destination device only from switching destination candidate devices that are suitable for the user's preference, and labor and time for an operation such as scrolling can be omitted. Thus, selection becomes easy.

Furthermore, high speed device switching section 801 of the switching source device starts transferring media data received from CN through media sending section 103 after switching destination candidate device list request (U1) is made by a user. Thus, since high speed device switching section 801 can shorten a time that elapses from the time when media data are started to be transferred to the time when a user selects a switching destination device, it is possible to reduce power consumption necessary for transferring media data prior to the switching.

Third Exemplary Embodiment

The configuration of a high speed device switching system in accordance with a third exemplary embodiment of the present invention is the same as that of the first exemplary embodiment shown in FIG. 19, and MN 1301 corresponds to a switching source device in accordance with the third exemplary embodiment. The switching source device of the third exemplary embodiment is different from that of the first exemplary embodiment in that the switching source device of the third exemplary embodiment completes service discovery, session establishment with a switching destination candidate device and the media processing preparation, and thereafter understands the state of the switching destination candidate device so as to update the switching destination candidate device list.

Figure 14:
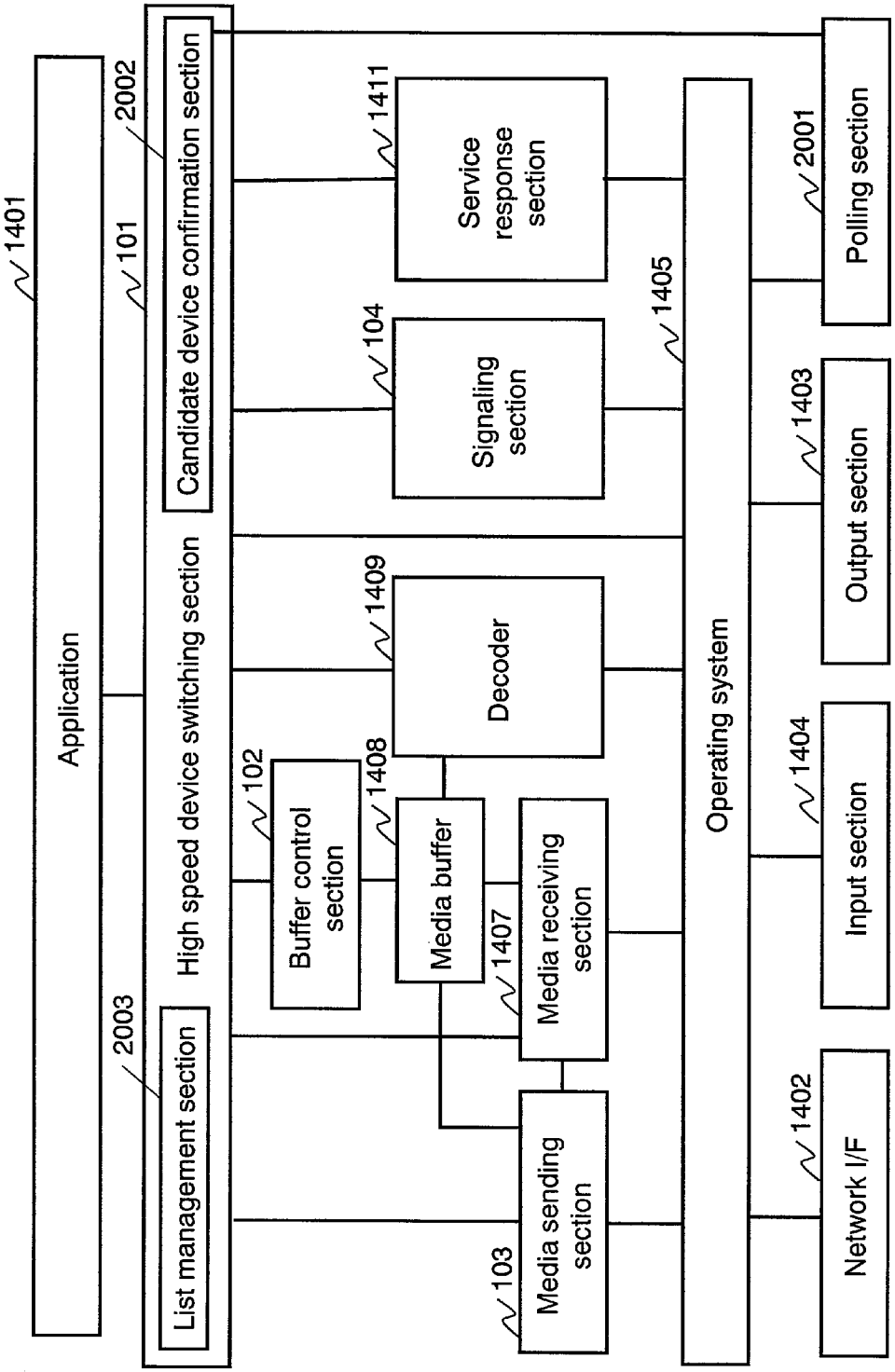
FIG. 14 is a block diagram showing a configuration of a switching source device in a high speed device switching system in accordance with a third exemplary embodiment of the present invention.

FIG. 14 is a diagram showing a configuration of the switching source device in accordance with the third exemplary embodiment. The same reference numerals are given to the same component elements shown in the switching source device shown in FIG. 1.

In FIG. 14, the switching source device in accordance with the third exemplary embodiment is provided with polling section 2001 for detecting the situation of the devices constituting PAN, and high speed device switching section 101 including candidate device confirmation section 2002 for confirming the continuation of the switching candidate device and list management section 2003 for updating the switching destination candidate device list.

Polling section 2001 sends a message to devises constituting PAN by MAC layer. Devices that do not respond for a predetermined time are regarded to be unconnected from the PAN (loss of connection). Polling section 2001 is directly connected to candidate device confirmation section 2002 and can exchange information at a high speed.

Candidate device confirmation section 2002 detects the change of the situation of the switching destination candidate device based on the information notified from polling section 2001 or signaling section 104. When it is detected that the switching destination candidate device is unusable or disabled, the detected result is notified to list management section 2003.

List management section 2003 manages the switching destination candidate device list and updates the list so that the list is always updated.

Prior to the description of an operation of the high speed device switching system in accordance with this exemplary embodiment, factors that make the switching destination candidate device obtained by the service discovery unusable or disabled is described briefly. As shown in FIG. 19, PAN 1305 is an Ad-Hoc network including a plurality of devices. Therefore, for example, due to the movement of NM 1301 or a device in device group 1304, radio wave of the PAN cannot reach the moved device, so that the switching destination device can be no longer work as a device constituting PAN 1305. This is the first factor.

Furthermore, devices in device group 1304 are often small battery-driven devices. In order to prevent electric power consumption, automatic switching to a sleep mode is usually carried out. Therefore, after service discovery, the switching destination candidate device is in a sleep mode and unusable. This is the second factor.

Furthermore, in the switching destination candidate device, when a service discovery request is made from a third party and if the third party has a higher priority, a service is started to be provided to the third party. At this time, the resource situation of the switching destination candidate device changes to "in use," a service cannot be provided to the switching source device and the switching destination device becomes unusable. This is the third factor.

The high speed device switching system of this exemplary embodiment can delete the switching destination candidate device, which becomes unusable or disabled due to the above-mentioned three factors, from the switching destination candidate device list by monitoring the situation of the switching destination candidate device. Thus, only if service discovery is carried out once, it is not necessary to carry out the service discovery periodically later or it is possible to increase the period of the service discovery.

Next, an operation of the high speed device switching system in accordance with this exemplary embodiment is described. This operation is different from the operation of the high speed device switching system shown in the first exemplary embodiment in that high speed device switching section 101 of the switching source device enters a stand-by state with respect to switching destination candidate device list display request (U1) (step S309), and at the same time it starts to monitor the switching destination candidate device in the background.

Figure 21:
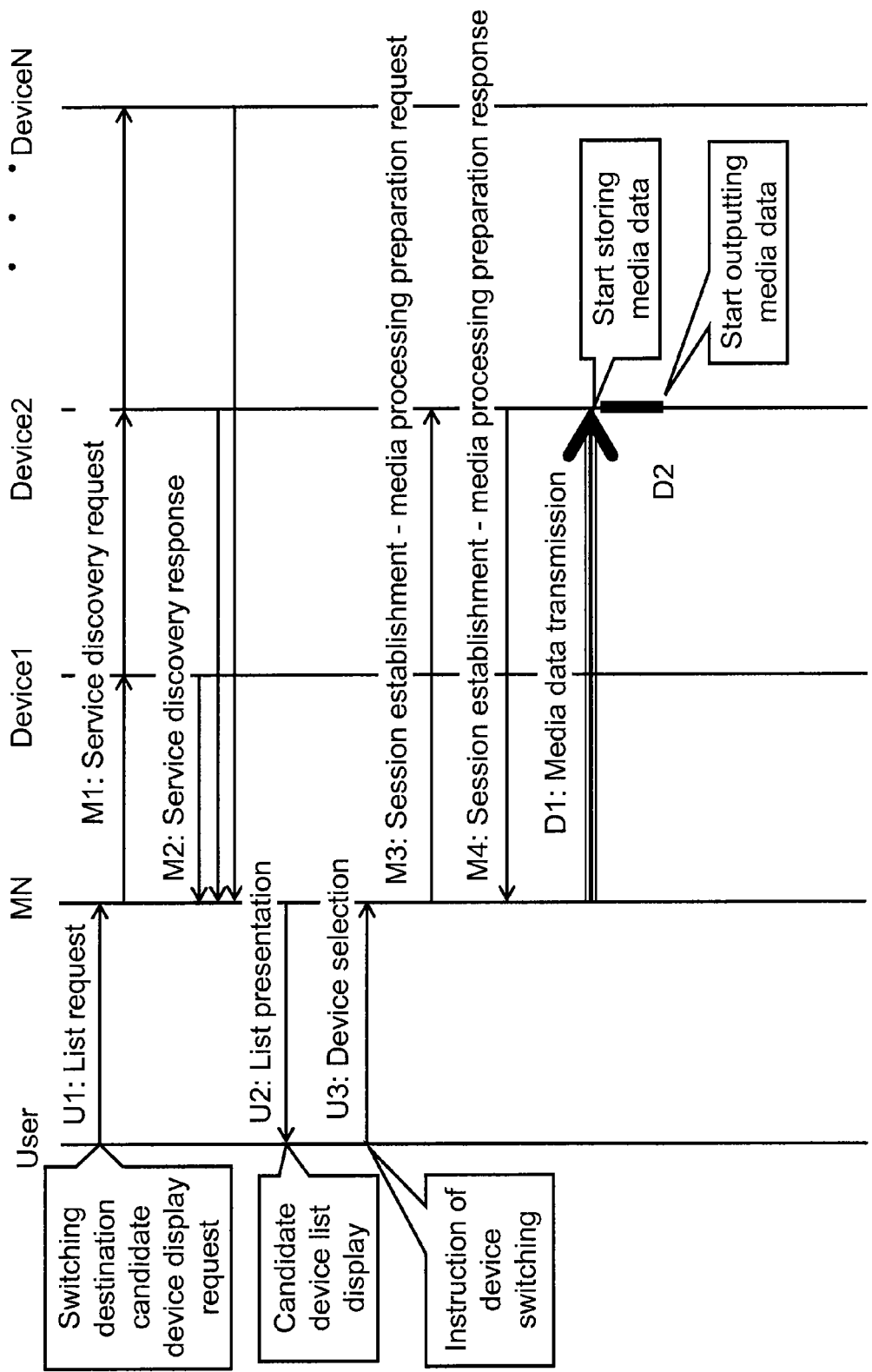
FIG. 21 is a sequence diagram showing a message exchange between the switching source device and a switching destination device group in a conventional device switching system.
Figure 22:
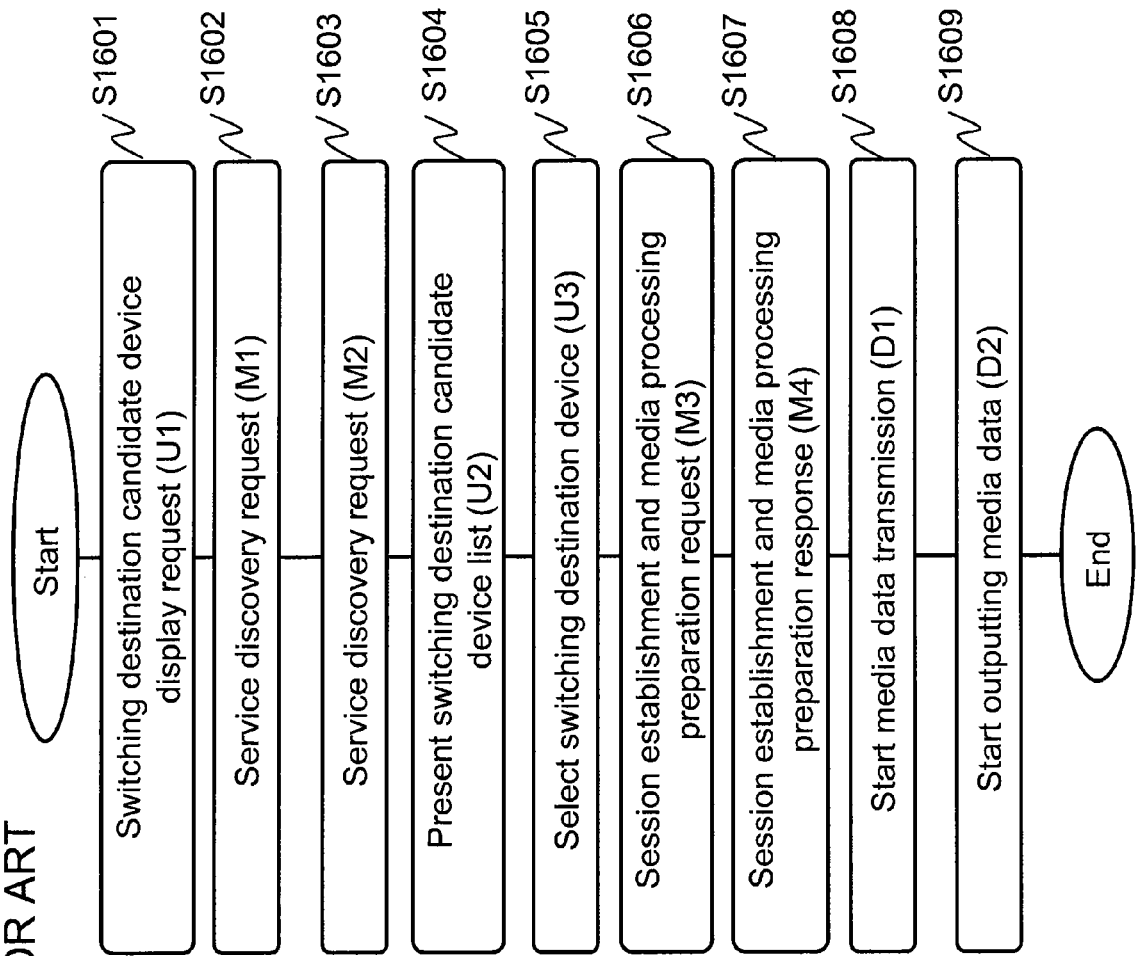
FIG. 22 is a flowchart showing a flow of an operation of a conventional device switching system.
Figure 23:
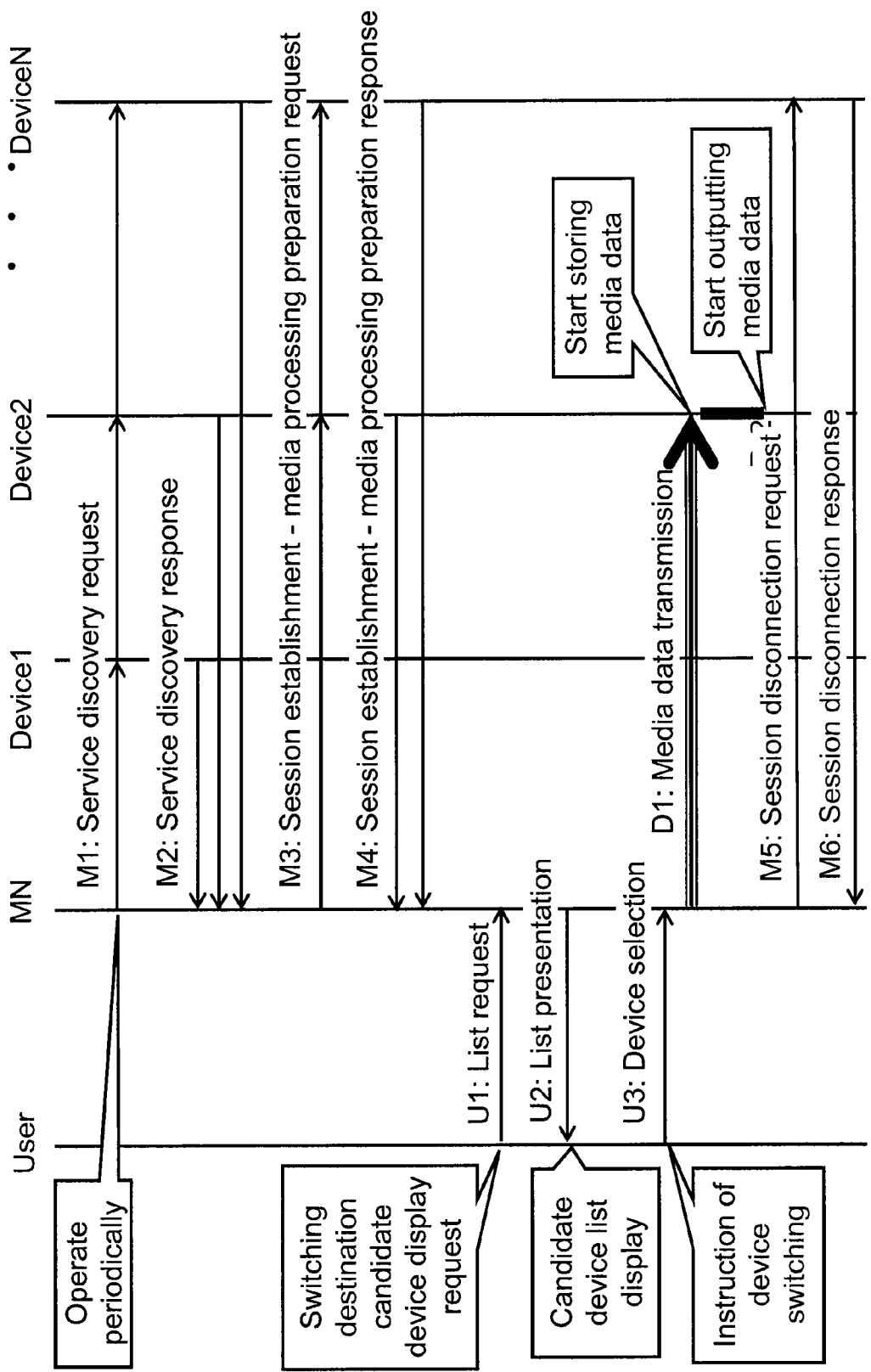
FIG. 23 is a sequence diagram showing a message exchange between the switching source device and a switching destination device group in a conventional device switching system.

FIG. 21 is a diagram showing an operation in which the switching source device in accordance with the third exemplary embodiment monitors the state of the switching destination candidate device and updates the switching destination candidate device list in the background.

In FIG. 21, high speed device switching section 101 starts up candidate device confirmation section 2002, and requests candidate device confirmation section 2002 to notify polling section 2001 of the change of the connection situations of the switching destination candidate device. Polling section 2001 regularly sends a message to devices constituting PAN by MAC layer and detects (that is, polling) whether or not a response is obtained from the devices within a predetermined time (step S2101).

Polling section 2001 receives a response from the device (step S2102) and compares the response with the previous polling result. When the connecting situation with respect to a device is changed, the change device information is notified to candidate device confirmation section 2002 (step S2103). The change device information includes information on a device that is newly added to PAN or information on a device disconnected from PAN.

Candidate device confirmation section 2002 confirms whether or not the switching destination candidate device is disconnected from the PAN based on the change device information (step S2104). When the switching destination candidate device is disconnected from the PAN, the information on the switching destination candidate device is notified to list management section 2003 (step S2105). List management section 2003 receives this notification and deletes this switching destination candidate device from the switching destination candidate device list (step S2106). Thus, the switching destination candidate device list is updated to the latest state.

Next, when switching destination candidate device list display request (U1) is made from a user, when a predetermined time has passed or when the number of devices newly added to PAN in candidate device confirmation section 2002 becomes a predetermined number or more, high speed device switching section 101 terminates the waiting state ("YES" in step S2107). Accordingly, candidate device confirmation section 2002 requests polling section 2001 to terminate the notification of changed device information to candidate device confirmation section 2002 (step S2108). Thus, an operation, in which the state of the switching destination candidate device is monitored and the switching destination candidate device list is updated in the background, is terminated.

On the other hand, when high speed device switching section 101 continues the waiting state ("NO" in step S2107), the step goes back to step S2102 and polling section 2001 repeats polling.

With the above-mentioned background operation, since the switching destination candidate device list is kept updated, the time in which high speed device switching section 101 waits for the switching destination candidate device list display request (U1) from a user (step S309) can be significantly enlarged. As a result, as compared with the first exemplary embodiment, it is possible to significantly increase the opportunity in which a user actually can carry out seamless high speed device switching.

Next, an operation of the high speed device switching system of this exemplary embodiment with respect to the fact that the switching destination candidate device obtained by the service discovery becomes disabled due to the above-mentioned third factor is described in detail hereinafter.

Figure 15:
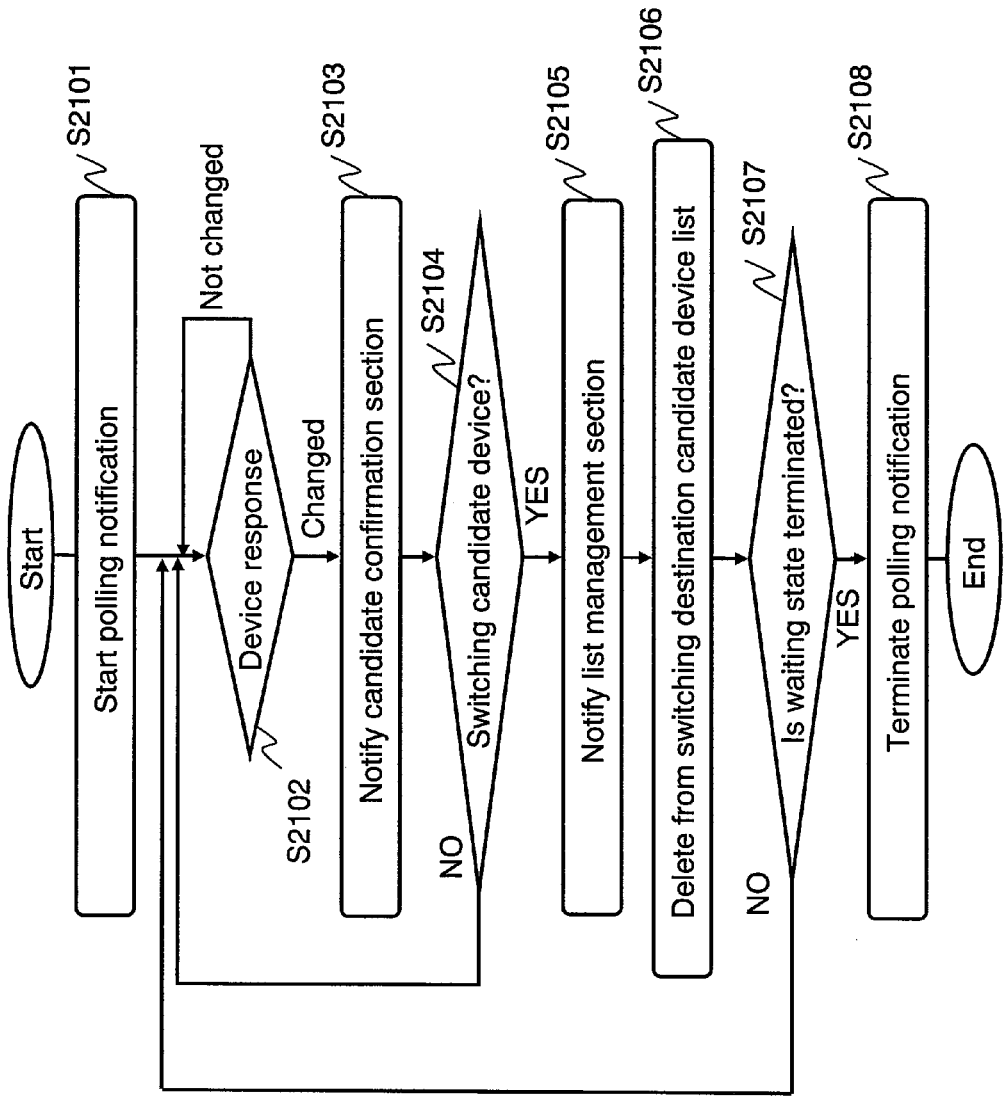
FIG. 15 is a flowchart showing a flow of an operation of the switching source device at the time of waiting a switching destination candidate device list display request from a user in the high speed device switching system in accordance with the third exemplary embodiment of the present invention.

When the service discovery request is made from the third party after the switching destination candidate device carries out session establishment—media processing preparation response (M4) with respect to the switching source device, in general, the switching destination candidate device responds to the third party that the service cannot be provided to the third party because it has established a session with the switching source device and the media processing preparation has been completed. However, when the priority that the third party receives a service is high, the switching destination candidate device notifies the switching source device that the service cannot be provided. Specifically, the high speed device switching section of the switching destination candidate device sends session disconnection request (M5) to the switching source device through the signaling section. When signaling section 101 of the switching source device receives session disconnection request (M5) sent by the switching destination candidate device, high speed device switching section 101 notifies candidate device confirmation section 2002 that the switching destination candidate device cannot provide the service as changed device information (step S2103). Since the switching destination candidate device cannot provide a service, the information of the switching destination candidate device is notified to list management section 2003 (step S2105). The later operations are the same as those shown in FIG. 15.

As mentioned above, in the switching destination candidate device, also in the case where the service discovery request is made from the third party and a service is started to be provided to the third party, by deleting the switching destination candidate device from the switching destination candidate device list of the switching source device, the switching destination candidate device list is updated to the latest situation. Thus, the time of waiting for the switching destination candidate device list display request (U1) from a user can be significantly enlarged. As a result, it is possible to significantly improve the probability at which the user can make an action of device switching and actually carry out the seamless high speed device switching.

Furthermore, according to this exemplary embodiment, since the candidate device confirmation section of the switching source device can sequentially detect devices newly added to PAN, by the number of newly added devices, it is also possible to properly change the period of the service discovery. Thus, the service discovery section of the switching source device can select a newly added device as a switching destination candidate device.

INDUSTRIAL APPLICABILITY

The present invention is useful for a high speed device switching system that switches devices while sending/receiving media data with respect to a communication counterpart and is suitable for realizing an extremely seamless service in which a time necessary for device switching is shortened such that a user can not perceive it. In particular, the present invention is useful for switching source devices and the switching destination devices in the case where pictures photographed by a portable telephone, a digital still camera, digital video movie, and the like, are output on a display device such as television.

The invention claimed is:

1. A switching source device for moving a session established with a communication counterpart to a switching destination device, comprising:
a service discovery section for obtaining information as to whether a service can be provided from a neighboring communication device;
a high speed device switching section for instructing the service discovery section at an arbitrary timing to inquire whether a service can be provided, determining a switching destination candidate device that is a switching destination of a session based on the obtained information as to whether the service can be provided, generating a switching destination candidate device list describing the switching destination candidate devices, and making an instruction for establishing a session with the switching destination candidate device;
a signaling section for establishing a session with the switching destination candidate device when the instruction for establishing a session is received from the high speed device switching section and;
an input section for receiving a switching destination candidate device list request from a user; and
an output section for presenting the switching destination candidate device list when the high speed device switching section receives the switching destination candidate device list request through the input section;
wherein when the high speed device switching section receives a device switching request from a user through the input section, it notifies the signaling section of the device selected from the switching candidate device list, and the signaling section sends a switching instruction to the selected device.

2. The switching source device of claim 1, further comprising
a media receiving section for receiving media data from a communication counterpart and storing them in a media buffer;
a buffer control section for controlling the media data stored in the media buffer; and
a media sending section for receiving a media data transfer request from the high speed device switching section and transferring the media data stored in the media buffer to all the switching destination candidate devices;
wherein when the device switching request from a user is received, the signaling section sends an instruction to the selected switching destination candidate device to output the received media data.

3. The switching source device of claim 2, wherein when a session with the switching destination candidate device is established, the signaling section sends media output control information that instructs to prohibit output of the media data received by the switching destination candidate device by adding the information to a payload or a header of the signaling message.

4. The switching source device of claim 2, wherein after the switching destination candidate device list request is input from a user, the media sending section transfers media data received from the communication counterpart to the switching destination candidate device by multicast or broadcast.

5. The switching source device of claim 4, wherein the high speed device switching section narrows down the switching destination candidate device based on preference information describing a previously set user's preference.

6. The switching source device of claim 2, wherein the buffer control section generates buffer control information including a buffer control policy or a data size for controlling the media buffer.

7. The switching source device of claim 2, wherein when a band between a self and the switching destination candidate device is larger than a band between the self and the communication counterpart,
the media sending section carries out burst transmission of the media data, and the buffer control section generates buffer information including a buffer control policy or a data size of the burst transmission necessary for buffer control at a time of burst transmission.

8. The switching source device of claim 7, wherein the signaling section sends the buffer control information by adding it to a payload or a header of a signaling message to be sent when a session with the switching destination candidate device is established.

9. The switching source device of claim 8, wherein when the media sending section adds a situation of media data generated by the buffer control section and stored in the media buffer to the payload or the header of the signaling message when the burst transmission of the media data is carried out.

10. The switching source device of claim 2, wherein when a band between a self and the switching destination candidate device is smaller than a band between the self and the communication counterpart, the media sending section carries out sequential transmission of the media data every time the media receiving section receives the media data, and
the buffer control section generates information including a buffer control policy or a data size necessary for buffer control at a time of sequential transmission.

11. The switching source device of claim 10, wherein the signaling section sends the buffer control information by adding it to a payload or a header of a signaling message to be sent when a session with the switching destination candidate device is established.

12. The switching source device of claim 11, wherein when the media sending section adds a situation of media data generated by the buffer control section and stored in the media buffer to the payload or the header of the signaling message when the burst transmission of the media data is carried out.

13. A switching destination device for receiving a movement of a session from a switching source device establishing the session with a communication counterpart, comprising:
- a service response section for responding to an inquiry sent from the switching source device as to whether a service can be provided;
- a signaling section for controlling a session between a self and the communication counterpart or the switching source device;
- a media receiving section for receiving media data from the communication counterpart and the switching source device when the service response section responds that a service can be provided;
- a media buffer for storing the media data received by the media receiving section;
- a buffer control section for controlling the media buffer based on buffer control information for making a state of the media buffer received after the signaling section establishes a session with the switching source device be identical with a state of the media buffer of the switching source device;
- an output section for providing a user with media data of the media buffer; and
- a high speed device switching section for outputting media data transferred from the switching source device to the output section based on a media output notification received by the signaling section from the switching source device.

14. The switching destination device of claim 13, wherein the signaling section receives media output control information that makes an instruction for prohibiting output of the media data received by the media receiving section when a session with the switching source device is established, and
the high speed device switching section prohibits output of the media data to the output section according to the media output control information.

15. The switching destination device of claim 13, wherein based on buffer control information of the switching source device added to a payload or a header of a signaling message received by the signaling section when a session with the switching source device is established,
the buffer control section controls so that a state of the media buffer is identical to a state of the media buffer of the switching source device.

16. A high speed device switching system for moving a session held by a switching source device with respect to a communication counterpart to a switching destination device other than the switching source device, comprising:
the switching source device for transmitting media data relating to the session to a switching destination device of a switching destination candidate by multicast or broadcast prior to a user selecting the switching destination device; and
wherein when the switching destination device is selected by a user, the switching destination device presents the media data received from the switching source device prior to selection to the user based on an output notification from the switching source device.

17. A signaling method in which a switching source device that moves a session established with a communication counterpart device to a switching destination device establishes a session with the switching destination device, the method comprising:
generating a signaling message for establishing a session with the switching destination device;
transmitting media data from the switching source device to the switching destination device prior to selecting the switching destination device;
generating media output control information showing an instruction for prohibiting output of the media data received by the switching destination device prior to selection;
adding the media output control information to a payload or a header of the signaling message;
sending the signaling message to the switching destination device; and
selecting the switching destination device to output the media data received from the switching source device prior to selection.

* * * * *